United States Patent
Subbarayan et al.

(10) Patent No.: US 11,582,199 B2
(45) Date of Patent: Feb. 14, 2023

(54) SCALABLE PROXY CLUSTERS

(71) Applicant: Ping Identity Corporation, Denver, CO (US)

(72) Inventors: Udayakumar Subbarayan, Bangalore (IN); Bernard Harguindeguy, Atherton, CA (US); Anoop Krishnan Gopalakrishnan, Bangalore (IN); Abdu Raheem Poonthiruthi, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 17/491,946

(22) Filed: Oct. 1, 2021

(65) Prior Publication Data
US 2022/0021656 A1 Jan. 20, 2022

Related U.S. Application Data

(60) Division of application No. 16/686,885, filed on Nov. 18, 2019, now Pat. No. 11,140,135, which is a
(Continued)

(51) Int. Cl.
*H04L 9/40* (2022.01)
*H04L 41/50* (2022.01)
(Continued)

(52) U.S. Cl.
CPC .......... *H04L 63/0281* (2013.01); *G06F 9/546* (2013.01); *H04L 41/0813* (2013.01);
(Continued)

(58) Field of Classification Search
CPC ............. H04L 63/0281; H04L 41/0813; H04L 41/0893; H04L 45/46; H04L 67/1014; H04L 67/1095
See application file for complete search history.

(56) References Cited

U.S. PATENT DOCUMENTS

| | | |
|---|---|---|
| 6,336,117 B1 | 1/2002 | Massarani |
| 7,209,962 B2 | 4/2007 | Boden |

(Continued)

FOREIGN PATENT DOCUMENTS

| | | | |
|---|---|---|---|
| EP | 2715540 A1 | 4/2014 |
| EP | 3678348 A1 | 7/2020 |

(Continued)

OTHER PUBLICATIONS

Bashar, A., "Autonomic scaling of cloud computing resources using BN-based prediction models," 2013 IEEE 2nd International Conference on Cloud Networking (CloudNet): Short Paper, IEEE, 2013, pp. 200-204.

(Continued)

*Primary Examiner* — Jimmy H Tran

(57) ABSTRACT

The invention enables high-availability, high-scale, high security and disaster recovery for API computing, including in terms of capture of data traffic passing through proxies, routing communications between clients and servers, and load balancing and/or forwarding functions. The invention inter alia provides (i) a scalable cluster of proxies configured to route communications between clients and servers, without any single point of failure, (ii) proxy nodes configured for implementing the scalable cluster (iii) efficient methods of configuring the proxy cluster, (iv) natural resiliency of clusters and/or proxy nodes within a cluster, (v) methods for scaling of clusters, (vi) configurability of clusters to span multiple servers, multiple racks and multiple datacenters, thereby ensuring high availability and disaster recovery (vii) switching between proxies or between servers without loss of session.

20 Claims, 9 Drawing Sheets

Related U.S. Application Data continuation of application No. 16/050,958, filed on Jul. 31, 2018, now Pat. No. 10,484,337, which is a division of application No. 15/164,512, filed on May 25, 2016, now Pat. No. 10,701,037.

(60) Provisional application No. 62/167,165, filed on May 27, 2015.

(51) Int. Cl.

| | |
|---|---|
| *H04L 67/02* | (2022.01) |
| *H04L 41/12* | (2022.01) |
| *H04L 67/10* | (2022.01) |
| *H04L 45/00* | (2022.01) |
| *H04L 45/58* | (2022.01) |
| *H04L 67/1095* | (2022.01) |
| *H04L 67/12* | (2022.01) |
| *H04L 67/145* | (2022.01) |
| *H04L 69/40* | (2022.01) |
| *H04L 67/1061* | (2022.01) |
| *H04L 41/0813* | (2022.01) |
| *H04L 67/01* | (2022.01) |
| *H04L 67/56* | (2022.01) |
| *H04L 67/60* | (2022.01) |
| *H04L 67/1014* | (2022.01) |
| *H04L 41/0893* | (2022.01) |
| *H04L 45/74* | (2022.01) |
| *H04L 47/125* | (2022.01) |
| *H04L 47/20* | (2022.01) |
| *H04L 69/16* | (2022.01) |
| *H04L 69/329* | (2022.01) |
| *G06F 9/54* | (2006.01) |
| *H04L 41/28* | (2022.01) |

(52) U.S. Cl.
CPC .......... *H04L 41/0893* (2013.01); *H04L 41/12* (2013.01); *H04L 41/28* (2013.01); *H04L 41/50* (2013.01); *H04L 45/46* (2013.01); *H04L 45/56* (2013.01); *H04L 45/58* (2013.01); *H04L 45/74* (2013.01); *H04L 47/125* (2013.01); *H04L 47/20* (2013.01); *H04L 63/08* (2013.01); *H04L 63/166* (2013.01); *H04L 67/01* (2022.05); *H04L 67/02* (2013.01); *H04L 67/10* (2013.01); *H04L 67/1014* (2013.01); *H04L 67/1068* (2013.01); *H04L 67/1095* (2013.01); *H04L 67/12* (2013.01); *H04L 67/145* (2013.01); *H04L 67/56* (2022.05); *H04L 67/60* (2022.05); *H04L 69/16* (2013.01); *H04L 69/329* (2013.01); *H04L 69/40* (2013.01)

(56) References Cited

U.S. PATENT DOCUMENTS

| | | |
|---|---|---|
| 7,716,274 B1 | 5/2010 | Kumar |
| 7,743,089 B2 | 6/2010 | Putzolu |
| 8,339,959 B1 | 12/2012 | Moisand et al. |
| 8,892,665 B1 | 11/2014 | Rostami-Hesarsorkh et al. |
| 8,949,828 B2 | 2/2015 | Pafumi et al. |
| 8,973,088 B1 | 3/2015 | Leung et al. |
| 8,990,942 B2 | 3/2015 | Thakadu et al. |
| 9,305,328 B2 | 4/2016 | Mahajan et al. |
| 9,307,017 B2 | 4/2016 | Wang et al. |
| 9,413,560 B2 | 8/2016 | Patil et al. |
| 9,443,079 B2 | 9/2016 | Reierson et al. |
| 9,516,053 B1 | 12/2016 | Muddu et al. |
| 9,537,756 B2 | 1/2017 | Bahadur et al. |
| 9,773,112 B1 | 9/2017 | Rathor et al. |
| 9,935,829 B1 | 4/2018 | Miller et al. |
| 9,948,703 B2 | 4/2018 | Olivier et al. |
| 10,025,873 B2 | 7/2018 | Jackson et al. |
| 10,038,742 B2 | 7/2018 | Reddy et al. |
| 10,193,867 B2 | 1/2019 | Subbarayan et al. |
| 10,484,337 B2 | 11/2019 | Subbarayan et al. |
| 10,511,574 B2 | 12/2019 | Poliashenko et al. |
| 10,587,580 B2 | 3/2020 | Subbarayan et al. |
| 10,666,621 B2 | 5/2020 | Subbarayan et al. |
| 10,681,012 B2 | 6/2020 | Subbarayan et al. |
| 10,699,010 B2 | 6/2020 | Subbarayan et al. |
| 10,701,037 B2 | 6/2020 | Subbarayan et al. |
| 10,726,491 B1 | 7/2020 | Hockey et al. |
| 10,834,054 B2 | 11/2020 | Subbarayan et al. |
| 10,909,241 B2 | 2/2021 | Puri et al. |
| 11,075,885 B2 | 7/2021 | Subbarayan et al. |
| 11,140,135 B2 | 10/2021 | Subbarayan et al. |
| 11,263,321 B2 | 3/2022 | Subbarayan et al. |
| 11,272,026 B2 | 3/2022 | Walsh et al. |
| 11,272,036 B2 | 3/2022 | Li |
| 11,411,923 B2 | 8/2022 | Subbarayan et al. |
| 2001/0039586 A1 | 11/2001 | Primak et al. |
| 2002/0112189 A1 | 8/2002 | Syvanne et al. |
| 2003/0110172 A1 | 6/2003 | Selman et al. |
| 2005/0015471 A1* | 1/2005 | Zhang ............... H04L 67/1001 726/4 |
| 2005/0027862 A1* | 2/2005 | Nguyen ............... H04L 63/062 709/225 |
| 2005/0165902 A1 | 7/2005 | Hellenthal et al. |
| 2005/0249199 A1 | 11/2005 | Albert et al. |
| 2006/0159082 A1 | 7/2006 | Cook et al. |
| 2006/0184661 A1 | 8/2006 | Weisman et al. |
| 2006/0248294 A1 | 11/2006 | Nedved et al. |
| 2007/0156919 A1* | 7/2007 | Potti ............... H04L 9/40 709/238 |
| 2007/0165622 A1 | 7/2007 | O'Rourke et al. |
| 2007/0192506 A1 | 8/2007 | Gupta et al. |
| 2007/0282979 A1 | 12/2007 | Tuel |
| 2008/0016339 A1 | 1/2008 | Shukla |
| 2008/0263654 A1 | 10/2008 | Bahl et al. |
| 2008/0276234 A1 | 11/2008 | Taylor et al. |
| 2008/0320582 A1 | 12/2008 | Chen et al. |
| 2009/0040926 A1 | 2/2009 | Li et al. |
| 2009/0067440 A1 | 3/2009 | Chadda et al. |
| 2009/0235067 A1* | 9/2009 | Miller ............... H04L 63/0884 713/151 |
| 2009/0327459 A1 | 12/2009 | Yoo et al. |
| 2010/0333111 A1 | 12/2010 | Kothamasu et al. |
| 2011/0145842 A1 | 6/2011 | Tofighbakhsh et al. |
| 2011/0295957 A1 | 12/2011 | Ananthanarayanan et al. |
| 2012/0054131 A1 | 3/2012 | Williamson |
| 2012/0059939 A1 | 3/2012 | Chandrasekaran et al. |
| 2012/0110603 A1 | 5/2012 | Kaneko et al. |
| 2012/0131639 A1 | 5/2012 | Alex et al. |
| 2012/0179819 A1* | 7/2012 | Hanson ............... H04L 41/0893 709/225 |
| 2012/0226820 A1 | 9/2012 | Li et al. |
| 2012/0233668 A1 | 9/2012 | Leafe et al. |
| 2012/0290511 A1 | 11/2012 | Frank et al. |
| 2012/0304244 A1 | 11/2012 | Xie et al. |
| 2013/0031403 A1 | 1/2013 | Mordani et al. |
| 2013/0044764 A1 | 2/2013 | Casado et al. |
| 2013/0054822 A1 | 2/2013 | Mordani et al. |
| 2013/0179947 A1* | 7/2013 | Kline, III ............ H04L 63/0892 726/4 |
| 2013/0205028 A1 | 8/2013 | Crockett et al. |
| 2013/0227091 A1 | 8/2013 | Tompkins |
| 2013/0339548 A1* | 12/2013 | Gopinath ............ H04L 61/5076 709/245 |
| 2014/0012966 A1 | 1/2014 | Baphna et al. |
| 2014/0019626 A1* | 1/2014 | Hubler .................. H04L 67/54 709/227 |
| 2014/0025986 A1 | 1/2014 | Kalyanaraman et al. |
| 2014/0059226 A1 | 2/2014 | Messerli et al. |
| 2014/0149590 A1 | 5/2014 | Mallipeddi et al. |
| 2014/0149605 A1 | 5/2014 | Annamalaisami et al. |
| 2014/0156836 A1* | 6/2014 | Demmer ............... H04L 67/52 709/224 |
| 2014/0237594 A1 | 8/2014 | Thakadu et al. |
| 2014/0258771 A1 | 9/2014 | Xie et al. |

(56) References Cited

U.S. PATENT DOCUMENTS

| | | |
|---|---|---|
| 2014/0280595 A1 | 9/2014 | Mani et al. |
| 2014/0280988 A1 | 9/2014 | Reynolds et al. |
| 2014/0304352 A1* | 10/2014 | Chaudhary ......... H04L 67/1029 709/208 |
| 2014/0337268 A1 | 11/2014 | Bhattacharya et al. |
| 2014/0344326 A1 | 11/2014 | Kamath et al. |
| 2014/0362681 A1 | 12/2014 | Bahadur et al. |
| 2014/0380087 A1 | 12/2014 | Jamjoom et al. |
| 2015/0026794 A1 | 1/2015 | Zuk et al. |
| 2015/0095887 A1 | 4/2015 | Bhattacharya |
| 2015/0128274 A1 | 5/2015 | Giokas |
| 2015/0161390 A1 | 6/2015 | Xuan |
| 2015/0180894 A1 | 6/2015 | Sadovsky et al. |
| 2015/0188760 A1 | 7/2015 | Anumala et al. |
| 2015/0188808 A1 | 7/2015 | Ghanwani et al. |
| 2015/0229579 A1 | 8/2015 | Kosim-Satyaputra et al. |
| 2015/0234639 A1 | 8/2015 | Allsbrook |
| 2015/0312102 A1* | 10/2015 | Backholm ........... H04L 41/0893 709/223 |
| 2015/0319136 A1 | 11/2015 | Xie et al. |
| 2015/0319226 A1 | 11/2015 | Mahmood |
| 2015/0358344 A1 | 12/2015 | Mumcuoglu et al. |
| 2015/0372938 A1 | 12/2015 | Patel et al. |
| 2016/0011732 A1 | 1/2016 | Yang |
| 2016/0036862 A1* | 2/2016 | Bagepalli ............. H04L 63/166 726/1 |
| 2016/0057173 A1 | 2/2016 | Singman et al. |
| 2016/0065672 A1 | 3/2016 | Savage et al. |
| 2016/0088023 A1* | 3/2016 | Handa .................... H04L 67/02 709/219 |
| 2016/0092297 A1 | 3/2016 | Mazon et al. |
| 2016/0098265 A1 | 4/2016 | Mahajan et al. |
| 2016/0205519 A1 | 7/2016 | Patel et al. |
| 2016/0234168 A1 | 8/2016 | Leung et al. |
| 2016/0248812 A1* | 8/2016 | Desai .................. H04L 63/1441 |
| 2016/0308721 A1 | 10/2016 | Dellisanti et al. |
| 2016/0308900 A1 | 10/2016 | Sadika et al. |
| 2016/0337474 A1 | 11/2016 | Rao |
| 2016/0352588 A1 | 12/2016 | Subbarayan et al. |
| 2016/0352867 A1 | 12/2016 | Subbarayan et al. |
| 2016/0366155 A1 | 12/2016 | El-Moussa et al. |
| 2017/0012941 A1 | 1/2017 | Subbarayan et al. |
| 2017/0097941 A1 | 4/2017 | Graves, Jr. et al. |
| 2017/0142100 A1* | 5/2017 | Bollay ................ H04L 63/0884 |
| 2017/0220798 A1 | 8/2017 | Madou et al. |
| 2017/0289307 A1 | 10/2017 | Thompson et al. |
| 2017/0302535 A1* | 10/2017 | Lee ..................... H04L 41/26 |
| 2017/0308446 A1 | 10/2017 | Kanso |
| 2017/0310708 A1 | 10/2017 | Schiappa et al. |
| 2018/0027115 A1* | 1/2018 | Kamboh ............. H04M 7/0075 379/45 |
| 2018/0046475 A1 | 2/2018 | Wei et al. |
| 2018/0109610 A1 | 4/2018 | Einkauf et al. |
| 2018/0115523 A1 | 4/2018 | Subbarayan et al. |
| 2018/0115578 A1 | 4/2018 | Subbarayan et al. |
| 2018/0173557 A1 | 6/2018 | Nakil et al. |
| 2018/0183823 A1 | 6/2018 | Fadlil et al. |
| 2018/0278635 A1 | 9/2018 | Shin et al. |
| 2018/0285095 A1 | 10/2018 | Aw et al. |
| 2018/0337891 A1 | 11/2018 | Subbarayan et al. |
| 2018/0337892 A1 | 11/2018 | Subbarayan et al. |
| 2018/0337893 A1 | 11/2018 | Subbarayan et al. |
| 2018/0337894 A1 | 11/2018 | Subbarayan et al. |
| 2018/0367433 A1* | 12/2018 | Luna ................... H04W 40/248 |
| 2019/0005576 A1 | 1/2019 | Mick et al. |
| 2019/0020722 A1 | 1/2019 | Haraszti et al. |
| 2019/0034199 A1 | 1/2019 | Pollock |
| 2019/0114417 A1 | 4/2019 | Subbarayan et al. |
| 2019/0245876 A1 | 8/2019 | Faigon et al. |
| 2019/0258473 A1* | 8/2019 | Vishnepolsky ......... H04L 67/02 |
| 2020/0162433 A1 | 5/2020 | Subbarayan et al. |
| 2020/0177556 A1 | 6/2020 | Subbarayan et al. |
| 2020/0220875 A1 | 7/2020 | Harguindeguy et al. |
| 2020/0304470 A1 | 9/2020 | Subbarayan et al. |
| 2020/0336467 A1 | 10/2020 | Subbarayan et al. |
| 2021/0004460 A1 | 1/2021 | Subbarayan et al. |
| 2022/0045990 A1 | 2/2022 | Subbarayan et al. |
| 2022/0217176 A1* | 7/2022 | Holloway ........... H04L 63/1466 |
| 2022/0263708 A1* | 8/2022 | Ramachandran ....... H04L 45/02 |

FOREIGN PATENT DOCUMENTS

| | | |
|---|---|---|
| WO | WO-2012162102 A1 | 11/2012 |
| WO | WO-2016168368 A1 | 10/2016 |

OTHER PUBLICATIONS

Extended European Search Report for European Application No. 18200235.2, dated Feb. 11, 2019, 9 pages.

Extended European Search Report for European Application No. 20150237.4, dated May 27, 2020, 13 pages.

Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).

Hachinyan, O., "Detection of Malicious Software Based on Multiple Equations of API-call Sequences," Feb. 2017, IEEE, pp. 415-418.

Lu, S. et al., "Elastic scaling of virtual clusters in cloud data center networks," 2017 IEEE 36th International Performance Computing and Communications Conference (IPCCC), IEEE, 2017, 8 pages.

Niu, D. et al., "Quality-assured cloud bandwidth auto-scaling for video-on-demand applications," 2012 Proceedings IEEE INFOCOM, 9 pages.

Office Action for European Application No. 18200235.2, dated Jan. 30, 2020, 7 pages.

Office Action for European Application No. 18200235.2, dated Sep. 14, 2020, 8 pages.

Office Action for European Application No. 20150237.4, dated Apr. 13, 2021, 10 pages.

Office Action for U.S. Appl. No. 15/164,512, dated Aug. 15, 2019, 16 pages.

Office Action for U.S. Appl. No. 15/164,512, dated Feb. 28, 2019, 18 pages.

Office Action for U.S. Appl. No. 15/164,512, dated Jul. 6, 2018, 9 pages.

Office Action for U.S. Appl. No. 15/164,555, dated Jan. 9, 2019, 19 pages.

Office Action for U.S. Appl. No. 15/164,555, dated Oct. 24, 2019, 24 pages.

Office Action for U.S. Appl. No. 15/164,587, dated Feb. 22, 2018, 17 pages.

Office Action for U.S. Appl. No. 15/792,850, dated Aug. 8, 2019, 9 pages.

Office Action for U.S. Appl. No. 15/793,671, dated Jul. 8, 2019, 36 pages.

Office Action for U.S. Appl. No. 16/050,915, dated Sep. 6, 2019, 18 pages.

Office Action for U.S. Appl. No. 16/050,958, dated Dec. 31, 2018, 7 pages.

Office Action for U.S. Appl. No. 16/050,996, dated Nov. 16, 2018, 6 pages.

Office Action for U.S. Appl. No. 16/051,026, dated Dec. 13, 2018, 6 pages.

Office Action for U.S. Appl. No. 16/158,836, dated Nov. 18, 2019, 13 pages.

Office Action for U.S. Appl. No. 16/733,570, dated Sep. 21, 2021, 15 pages.

Office Action for U.S. Appl. No. 16/788,059, dated Oct. 19, 2020, 6 pages.

Office Action for U.S. Appl. No. 16/909,272, dated Jun. 24, 2021, 10 pages.

WIKIPEDIA: "Honeypot (computing)," Sep. 2007 (Sep. 1, 2007), XP007917443, Retrieved from the Internet: URL:http://en.wikipedia.org/w/index.php?title=Honeypot_(computing)&oldid=159801521, [retrieved on Mar. 3, 2011], 12 pages.

(56) References Cited

OTHER PUBLICATIONS

Extended European Search Report for European Application No. 22157218.3, dated May 13, 2022, 11 pages.
Office Action for U.S. Appl. No. 16/881,376, dated Jun. 24, 2022, 8 pages.
Xu, J. et al,. "Lightweight and Adaptive Service API Performance Monitoring in Highly Dynamic Cloud Environment," 2017 IEEE International Conference on Services Computing (SCC), 2017, pp. 35-43.
Office Action for U.S. Appl. No. 17/680,767, dated Dec. 7, 2022, 13 pages.

\* cited by examiner

SCALABLE PROXY CLUSTERS

CROSS-REFERENCE TO RELATED APPLICATIONS

This application is a divisional of U.S. patent application Ser. No. 16/686,885, filed Nov. 18, 2019, (now U.S. Pat. No. 11,140,135), which is a continuation of U.S. patent application Ser. No. 16/050,958, filed Jul. 31, 2018, (now U.S. Pat. No. 10,484,337), which is a divisional of U.S. patent application Ser. No. 15/164,512, filed May 25, 2016, (now U.S. Pat. No. 10,701,037), which claims the benefit of U.S. Provisional Application Ser. No. 62/167,165, filed May 27, 2015, the disclosures of each of which are hereby incorporated by reference in their entirety.

FIELD OF THE INVENTION

The present invention relates to the field of high-availability, high-scale and high security computing for API computing and API ecosystems. In particular, the invention provides scalable proxy clusters, and methods for configuring proxy clusters and/or proxy nodes within the proxy clusters.

BACKGROUND

The use of a proxy as an intermediary between a client (i.e. a device requesting a service) and a server (i.e. a device providing the service) is known. Proxies can typically be used to implement several different networking functions, including any one or more of securing or capturing data samples of data traffic passing through such proxies, routing, load balancing and forwarding functions.

FIG. 1 illustrates a networking architecture comprising client 102, server backend 106 comprising servers 106a to 106c, proxy 104 and DNS server 108. Based on information retrieved from DNS server 108, requests or messages from client 102 for services from server backend 106 are directed to proxy 102. Proxy 102 thereafter transmits the received requests or messages to an appropriate server (106a to 106c) within server backend 106. Depending on the configuration of proxy 104, responses from servers 106a to 106c may first be received at proxy 102 and thereafter redirected to requesting client 102.

Proxy based configurations of the type illustrated in FIG. 1 have a finite processing capacity—which limits the number of clients and servers a proxy can simultaneously service. Additionally prior art configurations present limitations in terms of high availability—where "high availability" refers to the characteristic of a system to continue running and handling failures with minimum planned or unplanned down time.

There is accordingly a need for (i) a scalable cluster of proxies configured to route communications between clients and servers, without any single point of failure, (ii) efficient methods of configuring and scaling the cluster, (iii) natural resiliency of clusters, (iv) efficient scaling of such clusters, (v) configurability of such clusters to span multiple servers, multiple data racks and multiple data centers and (vi) to provide for switching between proxies in case of a proxy failure or between servers in case of failure of a server, rack or data center without loss of session information—thereby ensuring high availability and disaster recovery.

SUMMARY

The invention provides scalable proxy clusters, and methods for configuring proxy clusters and/or proxy nodes within the proxy clusters.

The invention provides a proxy node configured for implementation within a proxy cluster comprising a plurality of networked proxy nodes. The proxy node comprises (i) a processor, (ii) a proxy router configured to transmit received client message to one or more servers identified based on a specified routing policy, and (iii) a synchronization controller configured to respond to a defined synchronization event, by synchronizing one or more data states of the proxy node with corresponding one or more data states of at least one other proxy node within the plurality of proxy nodes.

The synchronization controller may be configured to respond to a defined synchronization event by synchronizing the one or more data states of the proxy node with corresponding one or more data states of every other proxy node within the plurality of proxy nodes.

The one or more data states of the proxy node or the corresponding one or more data states of the at least one other proxy node may comprise data states corresponding to any one or more of server characteristic data, session data, security data, configuration data and proxy node data associated with the respective proxy node.

The one the one or more data states of the proxy node or the corresponding one or more data states of the at least one other proxy node may comprise data states corresponding to server characteristic data, session data, security data, and configuration data associated with the respective proxy node.

In an embodiment of the invention, the proxy router may be configured such that routing functionality of the proxy node is identical to routing functionality of at least one other proxy node within the plurality of proxy nodes.

In an embodiment of the invention, the proxy node may be configured for self-learning one or more functional capabilities of one or more other proxy nodes within the plurality of proxy nodes—wherein said self-learning is based on the synchronizing one or more data states of the proxy node with corresponding one or more data states of at the one or more other proxy nodes within the plurality of proxy nodes.

The invention additionally provides a proxy cluster comprising a plurality of networked proxy nodes. At least one of the plurality of proxy nodes respectively comprises (i) a processor, (ii) a proxy router configured to transmit received client message to one or more servers identified based on a specified routing policy, and (iii) a synchronization controller configured to respond to a defined synchronization event, by synchronizing one or more data states of the proxy node with corresponding one or more data states of at least one other proxy node within the plurality of proxy nodes. The synchronization controller may be configured to respond to a defined synchronization event by synchronizing the one or more data states of the proxy node with corresponding one or more data states of every other proxy node within the plurality of proxy nodes.

One or more data states of the proxy node within the proxy cluster, or the corresponding one or more data states of the at least one other proxy node within the proxy cluster may comprise data states corresponding to any one or more of server characteristic data, session data, security data, configuration data and proxy node data associated with the respective proxy node.

The invention additionally provides a method of synchronizing data states between proxy nodes within a networked cluster of proxy nodes. The method comprises (i) detecting a synchronization event at a first proxy node within the cluster of proxy nodes, (ii) selecting a second proxy node from among the cluster of proxy nodes, and (iii) synchronizing one or more data states of the first proxy node with corresponding one or more data states of the second proxy node within the cluster of proxy nodes. Each proxy node within the cluster of proxy nodes may be configured to transmit received client message to one or more servers identified based on a specified routing policy.

In an embodiment of the method, the one or more data states of the first proxy node may be synchronized with one or more data states of every other proxy node within the cluster of proxy nodes. In a method embodiment, the one or more data states of the first proxy node or the corresponding one or more data states of the second proxy node may comprise data states corresponding to any one or more of server characteristic data, session data, security data, configuration data and proxy node data associated with the respective proxy node.

The invention additionally provides a method of adding a proxy node to a networked cluster of proxy nodes. The method comprises configuring a processor implemented first proxy node to (i) transmit received client message to one or more servers identified based on one or more routing policies, and (ii) respond to a defined synchronization event, by synchronizing one or more data states of the first proxy node with corresponding one or more data states of one or more proxy nodes within the cluster of proxy nodes. In an embodiment, the one or more data states of the first proxy node are synchronized with one or more data states of every proxy node within the cluster of proxy nodes. The one or more data states of the first proxy node or the corresponding one or more data states of the second proxy node may comprise data states corresponding to any one or more of server characteristic data, session data, security data, configuration data and proxy node data associated with the respective proxy node.

The invention additionally provides a method of modifying configuration of a proxy cluster comprising a plurality of networked proxy nodes, wherein each of the plurality of proxy nodes is configured to (i) transmit received client message to one or more servers identified based on a specified routing policy, and (ii) responsive to detection of a synchronization event, synchronize one or more data states of said proxy node with corresponding one or more data states of at least one other proxy node within the plurality of proxy nodes. The method comprises (i) receiving operator input identifying a modification to configuration of a first proxy node within the plurality of proxy nodes, (ii) responsive to the receive operator input, modifying the configuration of the first proxy node, and (iii) implementing a modification to configuration of a second proxy node within the plurality of proxy nodes, wherein said modification is effected by synchronization of one or more data states of said second proxy node with corresponding one or more data states of said first proxy, in response to detection of a synchronization event by the second proxy node.

The invention additionally provides a proxy cluster comprising a plurality of networked proxy nodes, wherein at least one of the plurality of proxy nodes respectively comprises (i) a processor, (ii) a proxy router configured to transmit received client message to one or more servers identified based on a specified routing policy, and (iii) a synchronization controller configured to respond to a defined synchronization event, by synchronizing one or more data states of the proxy node with corresponding one or more data states of at least one other proxy node within the plurality of proxy nodes. Additionally, the proxy cluster may be configured for one or more of high availability, disaster recovery, scalability and security of API computing use (i) within data centers, (ii) within private, public or hybrid clouds, (iii) across multiple datacenters, (iv) across private, public or hybrid clouds, and (v) across a combination of one or more datacenters and one or more clouds.

The invention additionally provides computer program products for implementing one or more of the above methods, the computer program product comprising a non-transitory computer usable medium having a computer readable program code embodied therein, said computer readable program code comprising instructions for implementing said one or more methods.

BRIEF DESCRIPTION OF THE ACCOMPANYING DRAWINGS

DETAILED DESCRIPTION

Figure 1:
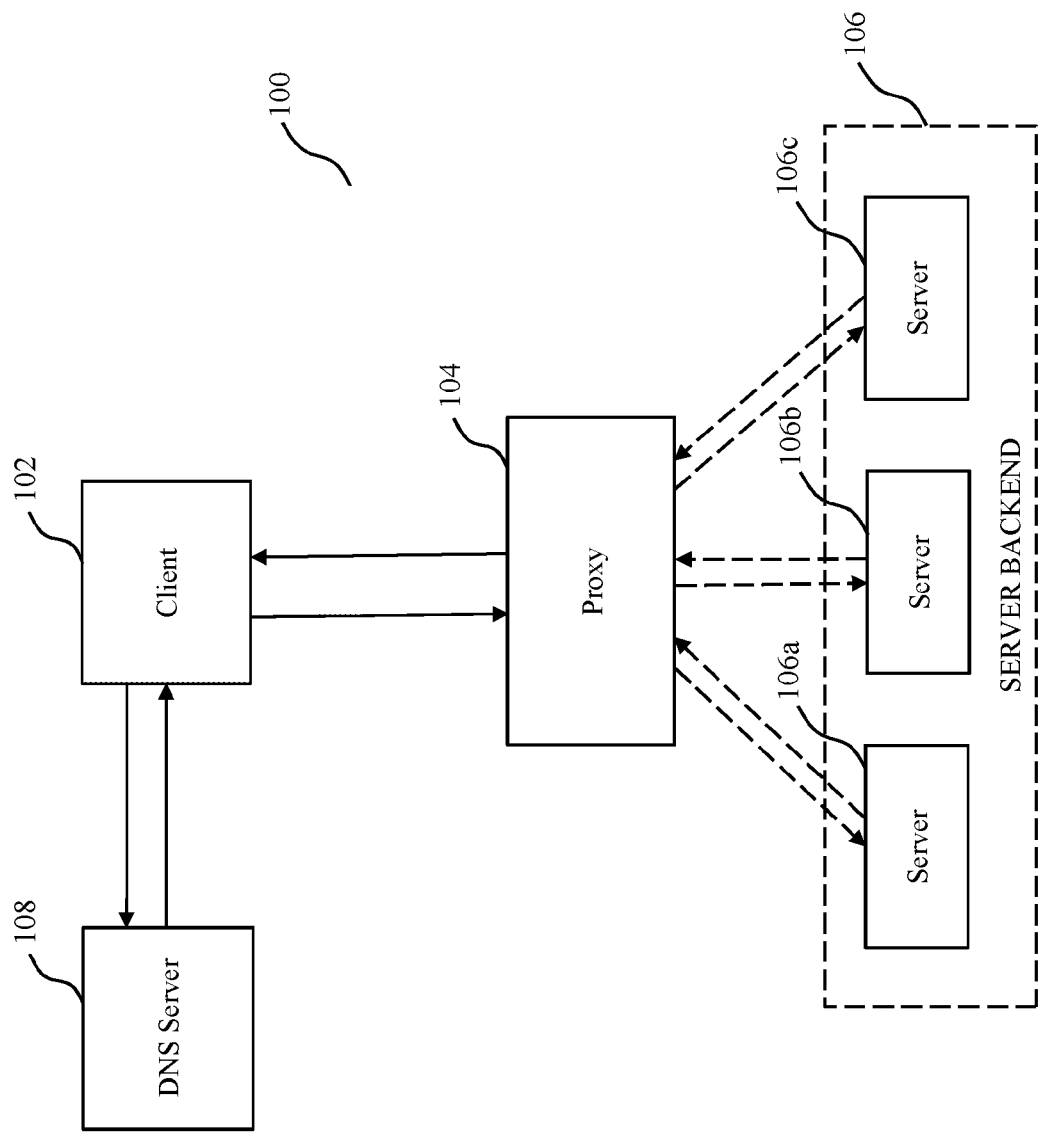
FIG. 1 illustrates a network configuration involving a prior art proxy interposed between a client device and a server backend.

The present invention provides a scalable cluster of proxies configured, which proxies may in various non limiting examples be configured for one or more of securing or capturing data samples of data traffic passing through such proxies, routing communications between one or more clients and one or more servers, load balancing and forwarding functions. The invention additionally provides for (i) a scalable cluster of proxies configured to route communications between clients and servers, without any single point of failure, (ii) efficient methods of configuring and scaling the cluster, (iii) natural resiliency of clusters and/or proxy nodes within a cluster, (iv) efficient scaling of clusters, (v) configurability of clusters to span multiple servers, multiple data racks and multiple data centers, (vi) switching between proxies in case of a proxy failure or between servers in case of failure of a server, rack or data center (for example in case of loss of power, internet, hardware or software errors etc.), without loss of session information, and (vii) responsive to server failure (for enabling reconnection of a client device with a backup server in the same datacenter or in a different datacenter—thereby ensuring high availability and disaster recovery.

For the purposes of the invention "client" shall mean any device having information processing and network communication capabilities. The types of clients may vary widely and include but are not limited to desktop computers, laptop computers or notebook computers, personal digital assistants, handheld computers, cellular phones, servers and Internet of Things (IOT) sensors or devices or gateways or servers.

For the purposes of the present invention, "proxy" or "proxy node" shall mean any device having information processing and network communication capabilities that may in various non limiting examples be configured for one or more of securing or capturing data samples of data traffic passing through such proxies, routing communications between one or more clients and one or more servers, load balancing and forwarding functions. The types of proxies may vary widely and include but are not limited to full proxies, half proxies, security proxies, IOT proxies or load balancing proxies.

For the purposes of the present invention, "proxy cluster" or "cluster of proxies" shall mean a plurality of proxy nodes. For the purposes of the present invention, proxy nodes within a proxy cluster may be understood as being interconnected in an overlay network.

For the purposes of the invention, "server" shall mean any device having information processing and network communication capabilities, and which is configured to provide one or more services to a requesting client, over a communication network. The types of servers may vary widely, and include but are not limited to API servers, Applications Servers, Microservices, web servers, FTP servers, IOT brokers or servers or gateways, message brokers, or service oriented architecture (SOA) servers.

For the purposes of the invention, "server backend" shall mean a set of one or more servers.

Figure 2:
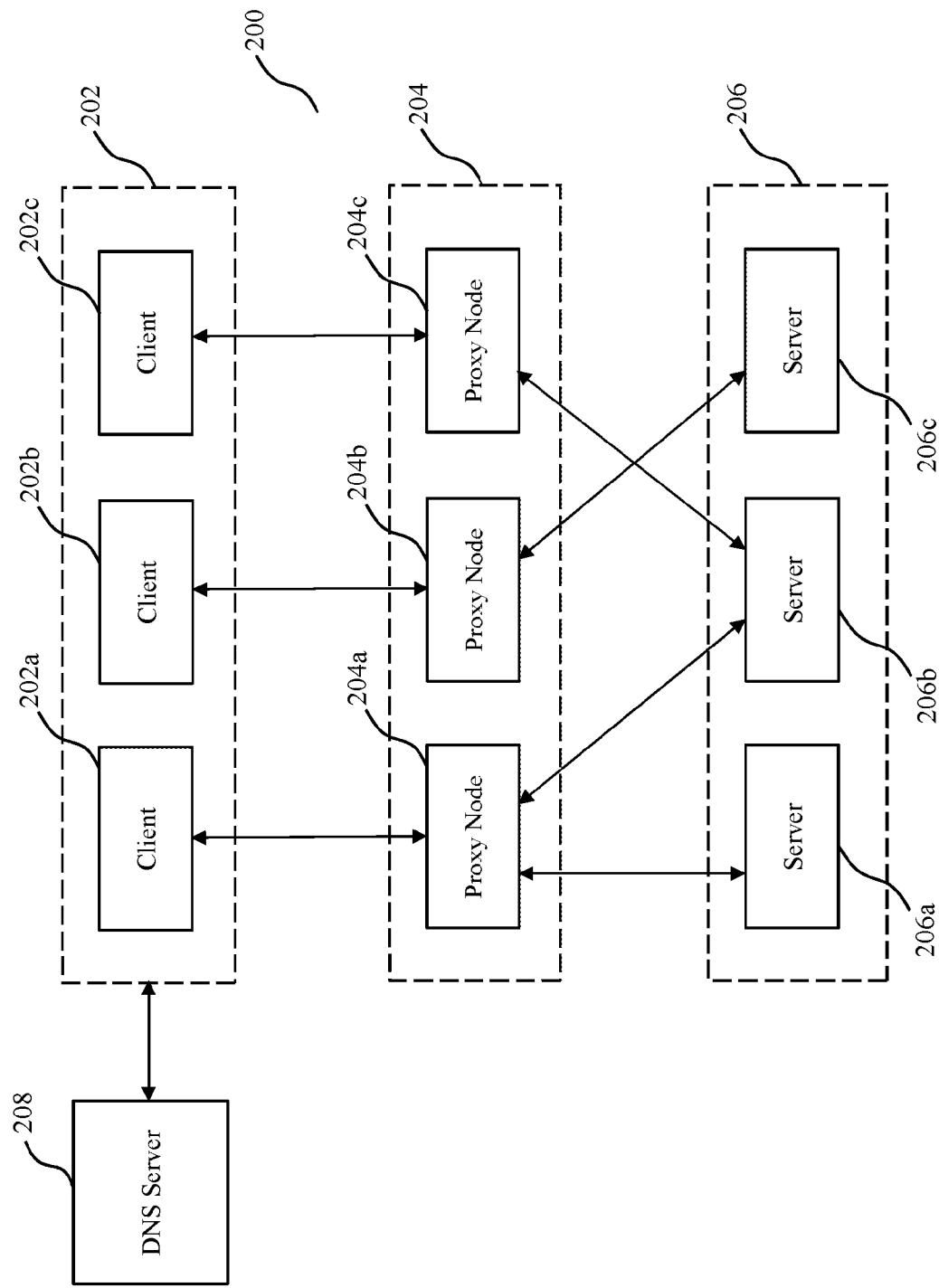
FIGS. 2 and 3 illustrate exemplary scalable proxy clusters.

FIG. 2 illustrates an embodiment of the invention, wherein proxy cluster 204 is disposed as a network intermediate between clients 202 (i.e. clients 202a, 202b and 202c) and server backend 206 (i.e. servers 206a, 206b and 206c). Each client request or client message directed towards server backend 206, and each response from server backend 206 is routed through proxy cluster 204.

As illustrated in FIG. 2, proxy cluster 204 comprises a plurality of proxy nodes (proxy nodes 204a, 204b and 204c). A client request or message for server backend 206 is routed to a proxy node within proxy cluster 204. Based on routing policies and/or other information available to the specific proxy node, said proxy node routes the client request to an appropriate server within server backend 206. Server responses to the client request or message are likewise transmitted from the server back to the specific proxy node, and onward from the specific proxy node to the client from which the request or message originated.

In the embodiment illustrated in FIG. 2 requests or messages from client 202a are routed to proxy node 204a within proxy cluster 204. Said requests or messages are thereafter routed to servers 206a and 206b within server backend 206. Likewise, a request from client 202b is routed to proxy node 204b and onward to server 206c within server backend 206. A request from client 202c is routed to proxy node 204c and onward to server 206b in server backend 206. Responses from the servers 206a to 206c are routed back to the corresponding requesting client through the same proxy node from which the request or message was received by the server.

The decision to route a client request or message to a specific proxy node within proxy cluster 204, may in an embodiment of the invention be based on routing logic or routing policies within DNS server 208 or other name server. Exemplary load balancing or connection parameters that the routing policies of DNS server 208 may rely on for selecting a specific proxy node within proxy cluster 204 may include one or more of location of the requesting client, location of the target server(s), existing load balance among proxies within the proxy clusters, content and/or type of request etc.

Selection of a target server (within server backend 206) by a proxy node within proxy cluster 204 may be determined based on routing logic or routing policies specified for the proxy node. In a specific embodiment of the invention, a plurality of proxy nodes within proxy cluster 204 (and preferably all proxy nodes within proxy cluster 204) may be configured to use identical routing policies for selecting a target server.

Figure 3:
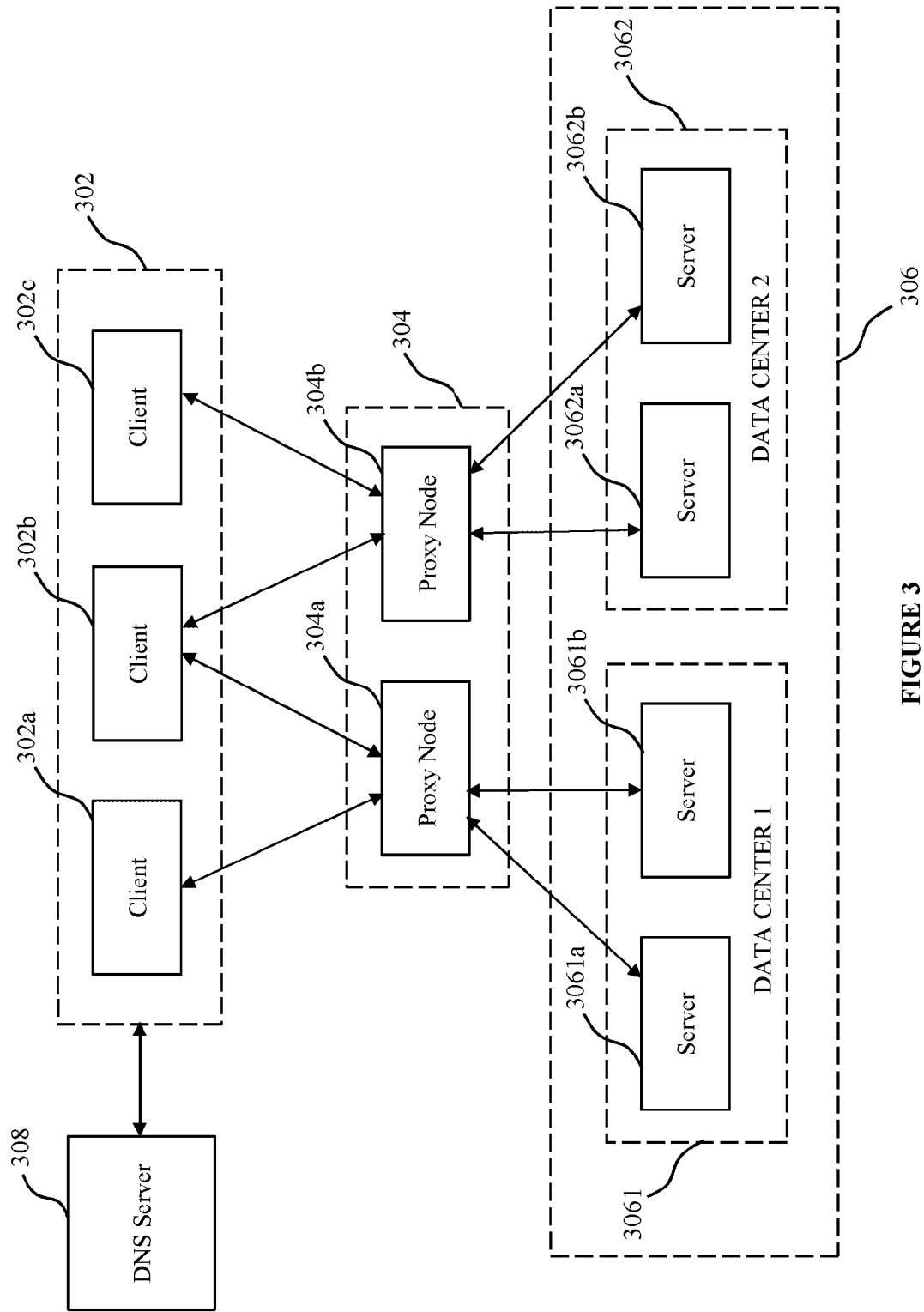

FIG. 3 illustrates another embodiment of the invention, wherein proxy cluster 304 is disposed as a network intermediate between clients 302 (i.e. clients 302a, 302b and 302c) and server backend 306. In the illustrated embodiment, server backend 306 comprises server cluster 3061 (in turn comprising servers 3061a and 3061b) corresponding to a first data center (data center 1) and server cluster 3062 (in turn comprising servers 3062a and 3062b) corresponding to a second data center (data center 2).

As in the case of FIG. 2, a client request or message relating to services from server backend 306 are routed through a proxy node within proxy cluster 304. In the illustrated embodiment, proxy cluster 304 comprises a plurality of proxy nodes 304a and 304b. A client request or message for one or more services from server backend 306 are routed to a specific proxy node within proxy cluster 304. The specific proxy node routes the client request or message to an appropriate server within server backend 306 and server responses are likewise transmitted from the server back to the specific proxy node, and onward to the requesting client.

As would be observed from the illustration in FIG. 3, client requests for (or messages to) servers within data center 1 are routed to a first proxy node (i.e. proxy node 304a), while client requests for (or messages to) servers within data center 2 are routed to a second proxy node (i.e. proxy node 304b). The decision to route a client request to a specific proxy node based on location of a target server, may in an embodiment of the invention be based on routing logic or routing policies within DNS server 308. In an embodiment of the invention, proxy nodes (304a, 304b) within proxy cluster 304 may be configured such that in case of failure of a server located within a specific server rack or a specific data center, the proxy node receiving client requests or messages targeted at the failed server may instead route such requests or messages to a backup server/mirror server/peer server providing the same functionality as the failed server. The configuration of proxy nodes within proxy cluster 304 ensures that such re-routing may be effected regardless of whether the failed server and backup server/mirror server/peer server are located within the same server rack or the same data center, or are located across multiple server racks and/or across multiple data centers. In an embodiment of the invention, proxy cluster 304 may be configured to respond to server failure by re-routing client messages or requests to a backup server/mirror server/peer server despite simultaneous failure of the proxy node that was previously receiving client requests or messages targeted at the failed server. Proxy cluster 304 may achieve this by substituting an operational proxy node within the proxy cluster for the failed proxy node—and may in an embodiment (discussed in more detail hereinafter) implement such substitution of proxy nodes and consequent re-routing of client messages or requests to a backup server/mirror server/peer server without having to re-initialize a client or user session (i.e. without loss of session data).

As in the case of FIG. 2, selection of a target server (within server backend 306) by a proxy node within proxy cluster 304 may be determined based on routing logic or routing policies provisioned for the proxy node. In a preferred embodiment, a plurality of proxy nodes within proxy cluster 304 (and preferably all proxy nodes within proxy cluster 304) are provisioned with identical routing policies for selecting a target server.

Figure 4:
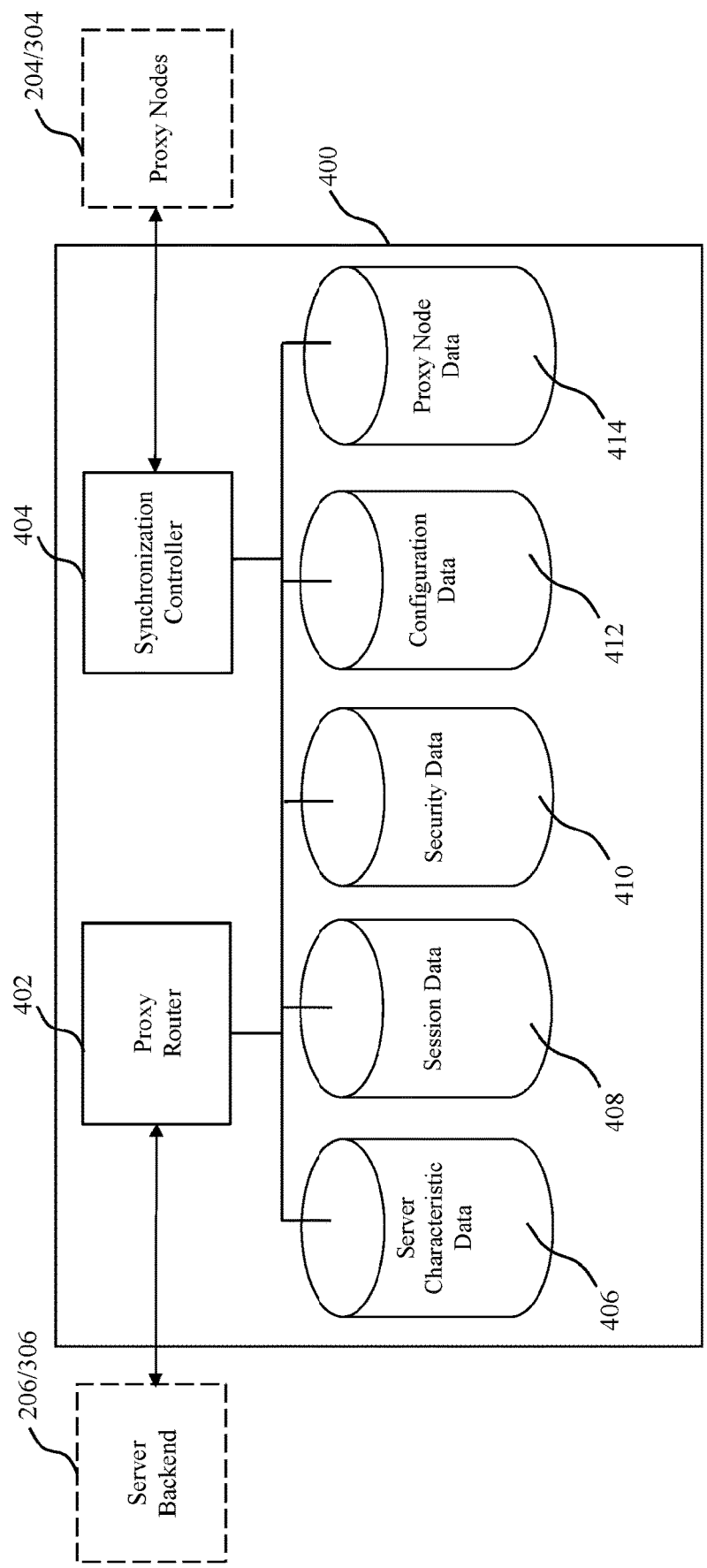
FIG. 4 illustrates a proxy node within a proxy cluster.

FIG. 4 illustrates an embodiment of a proxy node configured for implementation within a scalable proxy cluster of the present invention. Proxy node 400 comprises a proxy router 402 and a synchronization controller 404. Proxy node 400 may additionally include or enable access to one or more repositories of data associated with proxy node 400, said repositories of data comprising (i) server characteristic data 406, (ii) session data 408, (iii) security data 410, (iv) configuration data 412, and (v) proxy node data 414. One or more repositories comprising the above data may in various embodiment of the invention be accessible by one or both of proxy router 402 and synchronization controller 404.

Server characteristic data 406 comprises information identifying one or more characteristics of one or more servers within the server backend i.e. information that is descriptive of configuration, interfaces, and/or functionality of one or more servers within the server backend to which a proxy node is configured to route client requests or messages. In an embodiment of the invention, server characteristic data 406 includes one or more of (i) network sockets corresponding to servers, (ii) TCP, HTTP/Web-Socket, Request/Response, streaming and/or Publish/Subscribe message patterns for accessing servers (iii) business logic execution engine(s) implemented within servers (iv) backend connectivity between a server and other servers, (v) applications implemented on servers, and/or (vi) database systems relied on or implemented within servers.

Session data 408 comprises information identifying one or more characteristics of users/clients communicating through a proxy node. In an embodiment of the invention, session data 408 comprises one or more of (i) cookies, (ii) tokens, (iii) client ids and/or (iv) device ids. In a more specific embodiment of the invention, session data 408 may be limited to information that is active (i.e. that has not expired) in accordance with session expiry policies of one or more servers within the server backend to which a proxy node is configured to route client requests or messages.

Security data 410 comprises Transport Layer Security/Secure Sockets Layer (TLS/SSL) security data corresponding to each session that is active (i.e. that has not expired) in accordance with applicable session expiry policies. In an embodiment of the invention, security data 410 may comprise one or more of cipher suites, digital certificates (including one or more of server name, a trusted certificate authority (CA) and a backend server's public encryption key), session keys and/or asymmetric and symmetric ciphers that have been received at proxy node 400.

Configuration data 412 comprises configuration information that a proxy node requires to effect routing of incoming client requests or messages to a server within the server backend in one or more data centers. In an embodiment of the invention, configuration data 412 may comprise one or more of (i) data port information and/or other routing information corresponding to one or more servers within a server backend, (ii) load balancing or routing policies, (iii) load balancing and/or routing techniques (iv) management ports, (v) maximum number of processes/threads for each port, (vi) policies for generating logs (i.e. policies regarding what events or information to log, event triggers for logging and log persistence and/or management policies) and/or (vii) firewall settings corresponding to one or more servers within the server backend.

Proxy node data 414 comprises information identifying live or active proxy nodes (other than proxy node 400) within the proxy cluster. In an embodiment of the invention proxy node data 414 may comprise one or more of hardware identification information, IP address information and/or network routing information corresponding to such live or active proxy nodes within the proxy cluster.

Proxy router 402 comprises a processor based controller that is configured to (i) receive client requests or client messages, and (ii) responsive to received requests or messages satisfying one or more predefined criteria, transmitting said requests or messages onward to one or more server(s) within server backend 206, 306. Proxy router 402 is a controller configured to implement predefined routing logic or routing policies on client requests or messages received at a proxy node—to ensure that legitimate client requests or messages are transmitted onwards to a server configured to respond to such requests or messages. In an embodiment of the invention, in implementing onward transmission of received client requests or messages to one or more servers, proxy router 402 may rely on one or more of server characteristic data 406, session data 408, security data 410 and configuration data 412 that is associated with and accessible to proxy node 400.

Synchronization controller 404 comprises a processor based controller that is configured to respond to a predefined synchronization event or synchronization trigger by synchronizing (i) a data state of one or more of server characteristic data 406, session data 408, security data 410, configuration data 412 and proxy node data 414 that is associated with said proxy node, with (ii) a data state of corresponding server characteristic data, session data, security data, configuration data and/or proxy node data associated with another proxy node within proxy cluster 204, 304. In an embodiment of the invention, synchronization controller 404 is configured to synchronize data states of one or more (and preferably all) of server characteristic data 406, session data 408, security data 410, configuration data 412 and proxy node data 414 associated with said proxy node, with (ii) data states of corresponding server characteristic data, session data, security data, configuration data and proxy node data associated with every other proxy node within proxy cluster 204, 304. It would be understood that in an embodiment of the invention, synchronization of data states may involve synchronization of state changes that have occurred since a previous synchronization event. In an embodiment of the invention, synchronization controller 404 may be configured to establish distinct read and write connections with each proxy node that it synchronizes with. In an embodiment, the distinct read and write connections with each proxy node that a synchronization controller 404 synchronizes with, may be implemented by initializing separate read and write pipe endpoints for each such proxy node.

In a preferred embodiment of the invention, every proxy node within proxy cluster 204, 304 may comprise an instance of proxy node 400. Since synchronization controller 404 of each proxy node within the cluster is configured to ensure synchronization of the above mentioned proxy node data states with corresponding data states of every other proxy node within the cluster, the synchronization process results in all proxy nodes within the cluster having an identical data state corresponding to one or more (and preferably all) of server characteristic data, session data, security data, configuration data and proxy node data.

As discussed above, in implementing onward transmission of received client requests or messages to one or more servers, proxy router 402 within each proxy node 400 may rely on one or more of server characteristic data, session data, security data and configuration data that is associated with or accessible to proxy node 400. By configuring synchronization controller 404 within each proxy node 400 to ensure synchronization of each set of data that proxy router 402 relies on for implementing routing/onward transmission functionality, proxy cluster 204, 304 can be configured for self-learning, wherein any proxy node within the proxy cluster achieves the necessary functionality required by all proxy nodes in the proxy cluster, without requiring configuration by an operator or administrator. This ensures that in the case of a proxy node failure, upon resumption of service the failed proxy node synchronizes with other proxy nodes and is ready to resume operations without further loss of time and without further configuration. In an embodiment, the synchronization between proxy nodes additionally ensures that every proxy node within said proxy cluster performs routing/onward transmission functions identically (i.e. a specific client request or message will undergo identical routing/onward transmission by a recipient proxy node, regardless of which proxy node (within the proxy cluster) the client request or message is received at).

Figure 5:
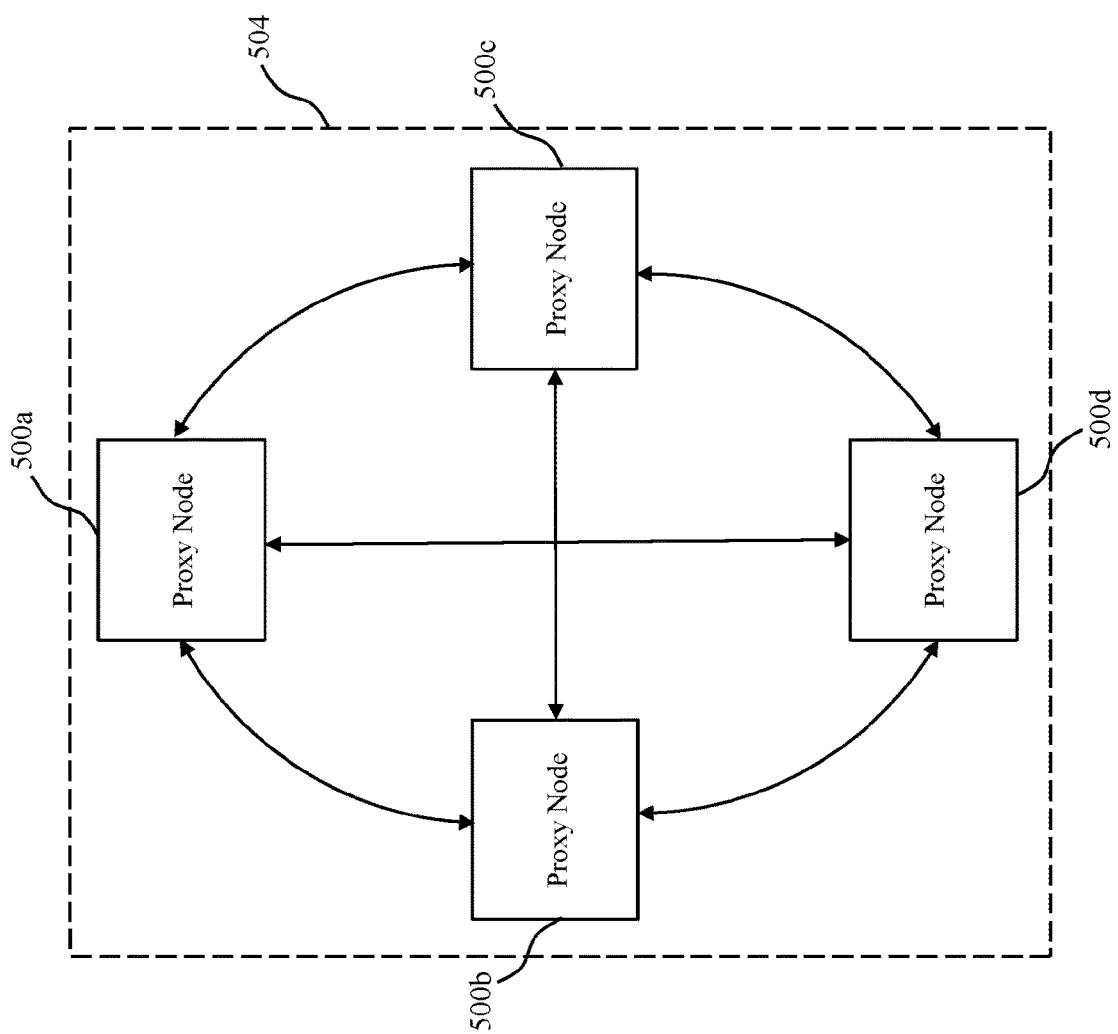
FIG. 5 illustrates a peer-to-peer network configuration of a proxy cluster.

FIG. 5 illustrates the embodiment of the invention where proxy cluster 504 comprises four proxy nodes 500a to 500d. While FIG. 5 illustrates a proxy cluster comprising only four proxy nodes, it will be understood that the four proxy nodes are only illustrative and that the proxy cluster may be scaled up or down to include any number of proxy nodes. Each proxy node 500a to 500d within proxy cluster 504 may comprise an instance of proxy node 400. Accordingly, the synchronization process between proxy nodes 500a to 500d may result in all proxy nodes within the cluster having identical data states corresponding to one or more (and preferably all) of server characteristic data 406, session data 408, security data 410, configuration data 412 and proxy node data 414. As illustrated in FIG. 5, the synchronization of data states between proxy nodes results in a peer-to-peer synchronization configuration within proxy cluster 504—wherein each proxy node 500a to 500d is a peer node within the peer-to-peer synchronization configuration.

In an embodiment of the invention, each proxy node within a proxy cluster periodically carries out a heartbeat messaging procedure (i.e. a ping-pong message/response procedure) with all other proxy nodes and updates its list of active peer nodes (i.e. proxy node data 414) depending on whether the heartbeat messaging procedure returns an error.

Figure 6:
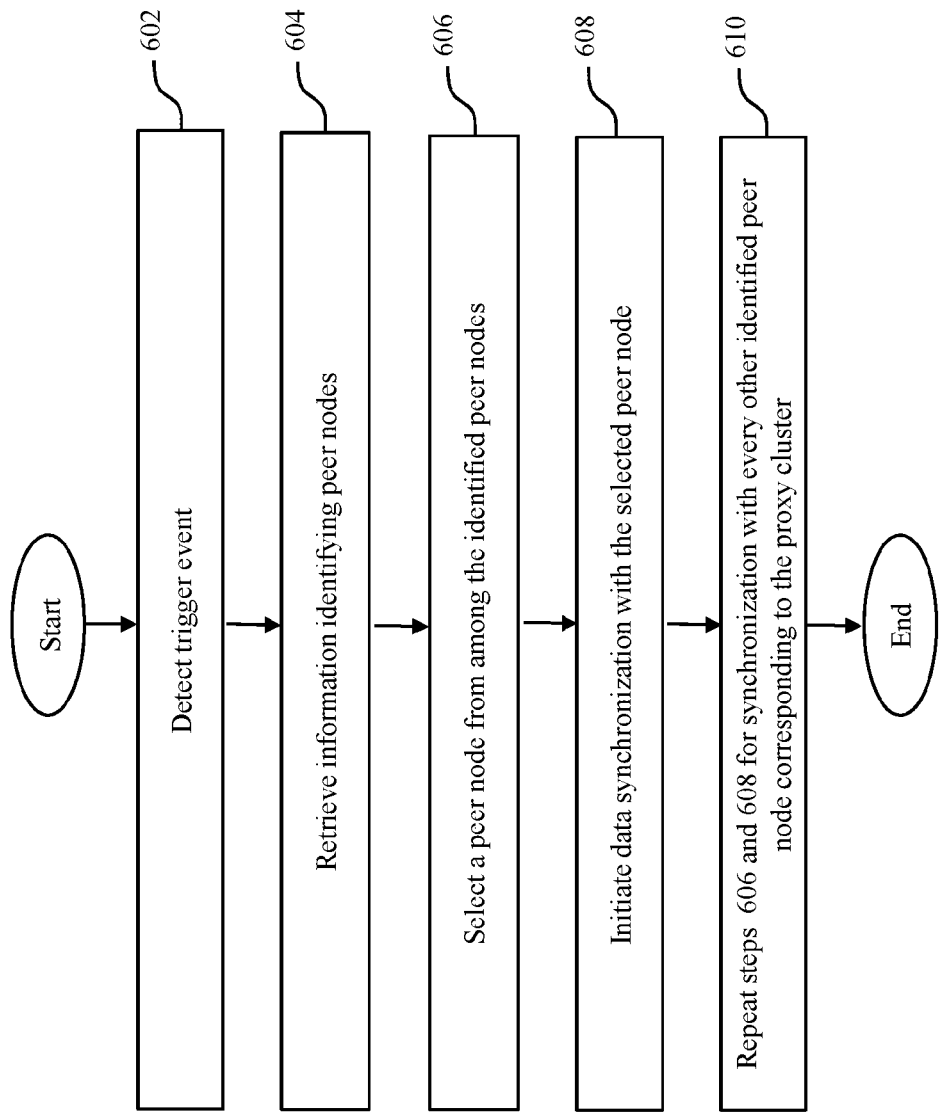
FIG. 6 is a flowchart illustrating a method of synchronizing proxy nodes within a proxy cluster.

FIG. 6 illustrates a method of achieving peer-to-peer synchronization between proxy nodes within a proxy cluster. For the purposes of FIG. 6, it will be understood that each peer node is a proxy node 400 of the type described in connection with FIG. 4. Further, the method of peer-to-peer synchronization in FIG. 6 is described in terms of achieving data state synchronization between a proxy node and all peer proxy nodes (i.e. all other proxy nodes) within the proxy cluster.

Step 602 of FIG. 6 comprises detection of a predefined synchronization trigger event at a proxy node. The synchronization trigger event may comprise any predefined event based trigger—and in an embodiment may comprise a time based event trigger. In an embodiment of the invention, the synchronization trigger event may comprise a trigger instruction generated at a proxy node upon expiry of a predefined time period from the last trigger instruction. In an embodiment of the invention, the synchronization trigger event may comprise a trigger instruction generated when a proxy node is bootstrapped into a proxy cluster, or when a proxy node resumes operations within a proxy cluster subsequent to recovery from a state of failure.

At step 604, responsive to detection of a trigger event at step 602, the proxy node retrieves information identifying peer nodes within the proxy cluster. In an embodiment of the invention, information identifying peer nodes within the proxy cluster may be retrieved from proxy node data 414 associated with proxy node 400.

Step 606 comprises selecting a peer node from among the identified peer nodes. Step 608 thereafter comprises initiating data synchronization at the proxy node—to achieve synchronization of (i) a data state of one or more of server characteristic data, session data, security data, configuration data and proxy node data associated with the proxy node, with (ii) a data state of corresponding server characteristic data, session data, security data, configuration data and proxy node data associated with the selected peer node. In an embodiment of the invention, initiating data synchronization at a proxy node comprises establishing distinct read and write connections with every other proxy node that said proxy node synchronizes with. In an embodiment, the distinct read and write connections with every other proxy node that the proxy node synchronizes with, may be implemented by initializing separate read and write pipe endpoints for every such other proxy node.

Step 610 comprises repeating steps 606 and 608 to achieve synchronization of data states (corresponding to the selected data parameters) within the proxy node with corresponding data states within every other identified peer node in the proxy cluster.

By implementing method steps of FIG. 6 across all peer proxy nodes within a proxy cluster, the method ensures that all proxy nodes within the proxy cluster have synchronized data states corresponding to one or more of server characteristic data, session data, security data, configuration data and proxy node data. By appropriately selecting parameters for synchronization of data states across proxy nodes, the method of FIG. 6 can ensure that every proxy node within the proxy cluster performs routing/onward transmission functions identically.

Figure 7:
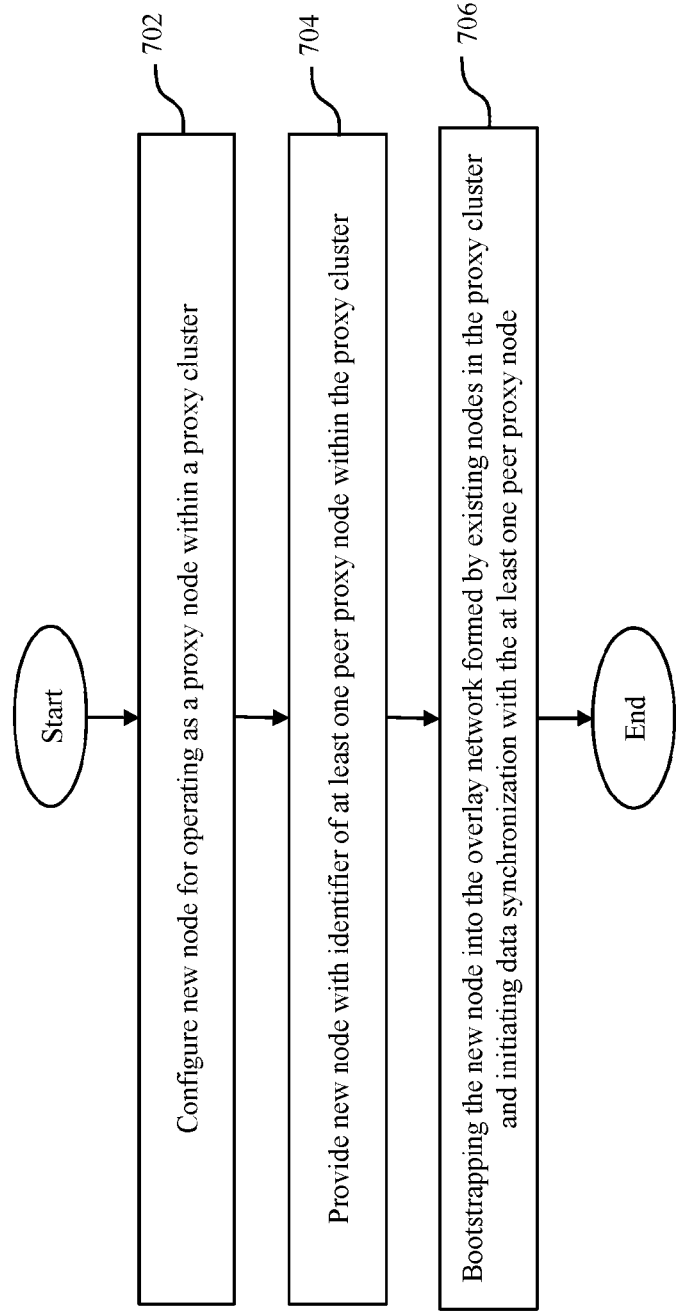
FIG. 7 illustrates a method of adding a new proxy node to a proxy cluster.

FIG. 7 illustrates an exemplary method for bootstrapping a new processing node and adding the new processing node as a proxy node within an existing proxy cluster. It would be understood that the method of FIG. 7 may be used for scaling the proxy cluster up in response to an increased demand for proxy nodes within the cluster.

Step 702 comprises configuring the new processing node for operating as a proxy node within a proxy cluster. Configuring the new processing node may comprise configuring one or more processors associated with the new processing node to implement functions of proxy router 402 and synchronization controller 404 that have been illustrated and described in connection with FIG. 4. In an embodiment, configuring the new processing node may comprise providing program instructions that enable the one or more processors associated with the new processing node to implement one or both of proxy router functionality and synchronization controller functionality.

Step 704 comprises provisioning the new processing node with an identifier of at least one existing peer proxy node within the proxy cluster. In an embodiment of the method, the identifier information provisioned at step 704 may comprise an IP address (or any other information described previously in connection with proxy node data 414 of FIG. 4) corresponding to at least one live or active peer node within the proxy cluster.

Step 706 comprises bootstrapping the new node into the overlay network formed by peer nodes in the proxy cluster, and initiating at the new node, a data state synchronization with at least one peer node of which the new node is aware. The data state synchronization between the new node and the peer node may in a preferred embodiment involve synchronization of data states of the new node with data states of the one peer node—in respect of one or more (and preferably all) of server characteristic data, session data, security data, configuration data and proxy node data associated with said proxy node.

In the process of data state synchronization either (i) the new node receives information regarding all other peer nodes identified within the proxy node data 414 corresponding to the peer node, or (ii) the peer node broadcasts address information corresponding to the new node to every other peer node identified within proxy node data 414 corresponding to said peer node—both of which methods (when coupled with the step of data synchronization between all proxy nodes within the proxy cluster) result in data state synchronization between the new node and all other peer nodes within the proxy cluster. By implementation of data state synchronization between the new node and every peer node within the proxy cluster, the new node achieves data state synchronization with all pre-existing peer nodes within the proxy cluster—thereby achieving the status of a fully synchronized peer node within the proxy cluster.

While not specifically illustrated, it would also be understood that each pre-existing peer node within the proxy cluster updates its proxy node data 414 to include received identifier or address information corresponding to each new peer node, thereby adding to its own list of active peer nodes with which data state synchronization requires to be implemented in response to the next synchronization event or synchronization trigger.

In a preferred embodiment, bootstrapping the new node into the proxy cluster may additionally include adding or modifying (automatically or manually) one or more DNS server entries corresponding to one or more servers within the server backend that is serviced by the proxy cluster, wherein the added or modified DNS server entries comprises address information corresponding to the new node, and may also include data that is determinative of routing policies that may be applied by the DNS server for routing client requests or messages to the new node.

It would likewise be understood that one or more nodes may be removed from the proxy cluster to scale the proxy cluster down in response to a decreased demand for proxy nodes. In one embodiment, this process may comprise removal of a peer node from network communication with the remaining peer nodes, and updating proxy node data in at least one of the remaining peer nodes—which updating comprises removal of the removed peer node from the list of active peer nodes. By virtue of periodic data synchronization, this updating of proxy node data will be communicated to (and updated at) all other peer nodes within the proxy network in response to the next synchronization event or synchronization trigger. In another embodiment, failure of any peer node to response to a predefined number of heartbeat messages (ping messages) may result in the peer node being marked as inactive and/or deleted from proxy node data 414 within each proxy node Likewise DNS server entries corresponding to a removed peer node may be automatically modified to reflect the inactive/removed status in response to one or more error messages received in response to requests or messages routed to the removed peer node. In another embodiment, DNS server entries may be updated by a proxy node within the proxy cluster (or by the proxy cluster) in response to a new proxy node being added to the proxy cluster or a previously operational proxy node being removed from the proxy cluster. In case of removal or failure of a previously operational proxy node, data traffic workload previously being handled by the removed or failed node will be handled by one or more of the remaining proxy nodes within the proxy cluster until the removed or failed proxy node resumes operations, at which time it synchronizes with one or more of the remaining proxy nodes in the proxy cluster and resumes operations as before.

In an embodiment of the invention, the proxy cluster may be accessible through a command-line-interpreter (CLI) or a RESTful API (REST API) which permits configuration inputs and/or configuration modifications at any one or more proxy nodes within the proxy cluster. In an embodiment of the invention, any additions or modifications to any one of server characteristic data, session data, security data, configuration data and proxy node data associated with proxy nodes within the proxy cluster, may be implemented at any one of the proxy nodes through the CLI or REST API— which additions or modifications will be automatically communicated to and implemented within all other proxy nodes within the proxy cluster by way of data state synchronizations implemented by each proxy node within the proxy cluster. It would accordingly be understood that implementation of data state synchronizations between proxy nodes within a proxy cluster presents significant advantages in terms of ease of administration and configuration of nodes within the proxy cluster.

In an embodiment of the invention, the proxy cluster can support multiple communication and/or messaging protocols, both at the node level and at the cluster level. Exemplary non-limiting examples of protocols that can be supported at the node level or at the cluster level within the proxy cluster include (i) HTTP/HTTPS, (ii) WebSocket/ WebSocket over SSL, (iii) MQTT/Web Socket, (iv) MQTT/ Web Socket over SSL, (v) MQTT/TCP, (vi) MQTT/TLS, and (vii) CoAP.

Based on the above, it would be understood that proxy clusters in accordance with the teachings of the present invention offer multiple advantages over solutions known in the prior art.

A primary advantage comprises scalability or elasticity in terms of (i) a number of users/clients that can be served, (ii) type of client devices that can be served within the same or across different data centers, (iii) a number of servers within the server backend that can be served, and/or (iv) a number of protocols that can be served or accommodated.

The invention also enables proxy nodes to be added to or removed from a proxy cluster with minimal configuration overheads. By enabling ready upward and downward scaling, the invention presents significant cost advantages over the prior art. The invention further avoids dependence on a master-slave or a centralized control model—which makes proxy clusters of the present invention simpler to configure as well as to scale.

In addition to the above, proxy clusters of the present invention avoid any single point of failure—by providing alternative proxy nodes for routing of client requests or messages in case of failure of one or more proxy nodes. This natural resiliency ensures high availability. Additionally, assuming a specific proxy node fails but later comes back online, the data state synchronization process ensures that the revived proxy node is synchronized with all other peer proxy nodes in the course of the next synchronization event—and that such proxy node can therefore resume full functionality upon conclusion of the next synchronization event.

The resilience and data state synchronization aspects of the proxy cluster also enable real time and "live" reconfiguration or updates of the proxies to reflect changes to APIs or API servers within the server backend or to provide new routing instructions. In the process of reconfiguration or updating of one or more servers, corresponding server characteristic data 408 within one of the proxy nodes 400 is updated. While such updating of information occurs at the proxy node 400, the proxy node is unable to continue providing functionality as a proxy node within the proxy cluster—during which period the remaining proxy nodes in the proxy cluster continue to route information between clients and servers and thereby ensure high availability. Once the updating of information is complete, the updated proxy node is rebooted and brought back online within the proxy cluster. The updated information now available at the updated proxy node may be propagated to all other proxy nodes within the proxy cluster during the next data state synchronization event—which ensures updating of information throughout the proxy cluster, without the proxy cluster suffering a system failure or outage at any point of time. It would be understood that functioning of the proxy cluster, and transmission of client requests or messages between clients and the server backend can continue without observable disruption while the above described server updates/reconfiguration, proxy node updating and proxy node synchronization is implemented.

Since in certain embodiments, synchronization of data states includes synchronization of session data 408 and security data 410, a user or client device may be shifted from one proxy node within a proxy cluster to another proxy node within the cluster (for example, in response to failure of a proxy node, or in response to a shift due to a change in state of a user or client device) without having to reinitialize a user session or client session.

In an embodiment of the invention, the proxy cluster is a non-symmetric cluster, in that at least two proxy nodes within the proxy cluster have different operating specifications in terms of one or more of hardware, operating systems and/or application software.

It would be understood that proxy clusters in accordance with the teachings of the present invention can be configured to span one or more server backends that are implemented across a plurality of server racks and/or a plurality of datacenters. In addition to enabling scalability of the proxy cluster, the invention enables geography specific scaling of proxy clusters based on local demand, as well as setting up of cross-border datacenters. The data state synchronizations of the invention additionally ensure persistence of data and metadata across all proxy nodes within a proxy cluster—which data and metadata may span a server backend that has been set up across multiple datacenters. Persistence of data and metadata across data centers has been found to present significant advantages over the earlier state of art—particularly in view that synchronizing session state data ensures true session recovery (for high availability and/or disaster recovery) by servers in a second datacenter in case of failure of servers within a first datacenter—thereby ensuring that an ongoing session and/or business logic within an ongoing session can be continued without having to re-initialize the session.

The proxy cluster may be configured to span at least two data centers, wherein the secondary data center (and servers therein) is configured to provide disaster recovery support for the primary data center. In an embodiment, the proxy cluster is configured such that in case of a disaster event causing entire failure of the primary data center (including one or more proxy nodes corresponding to said primary data center), the DNS server (or other name server) is reconfigured (automatically or manually) to route client requests or messages to the secondary data center without causing disruption to the end user(s). In another embodiment, the proxy cluster is configured such that in the event the primary data center (or servers therein) fails without a corresponding failure of proxy nodes servicing said primary data center, client requests or messages corresponding to client sessions that were previously being serviced by the primary data center are subsequently routed to one or more servers within the secondary data center.

Figure 8:
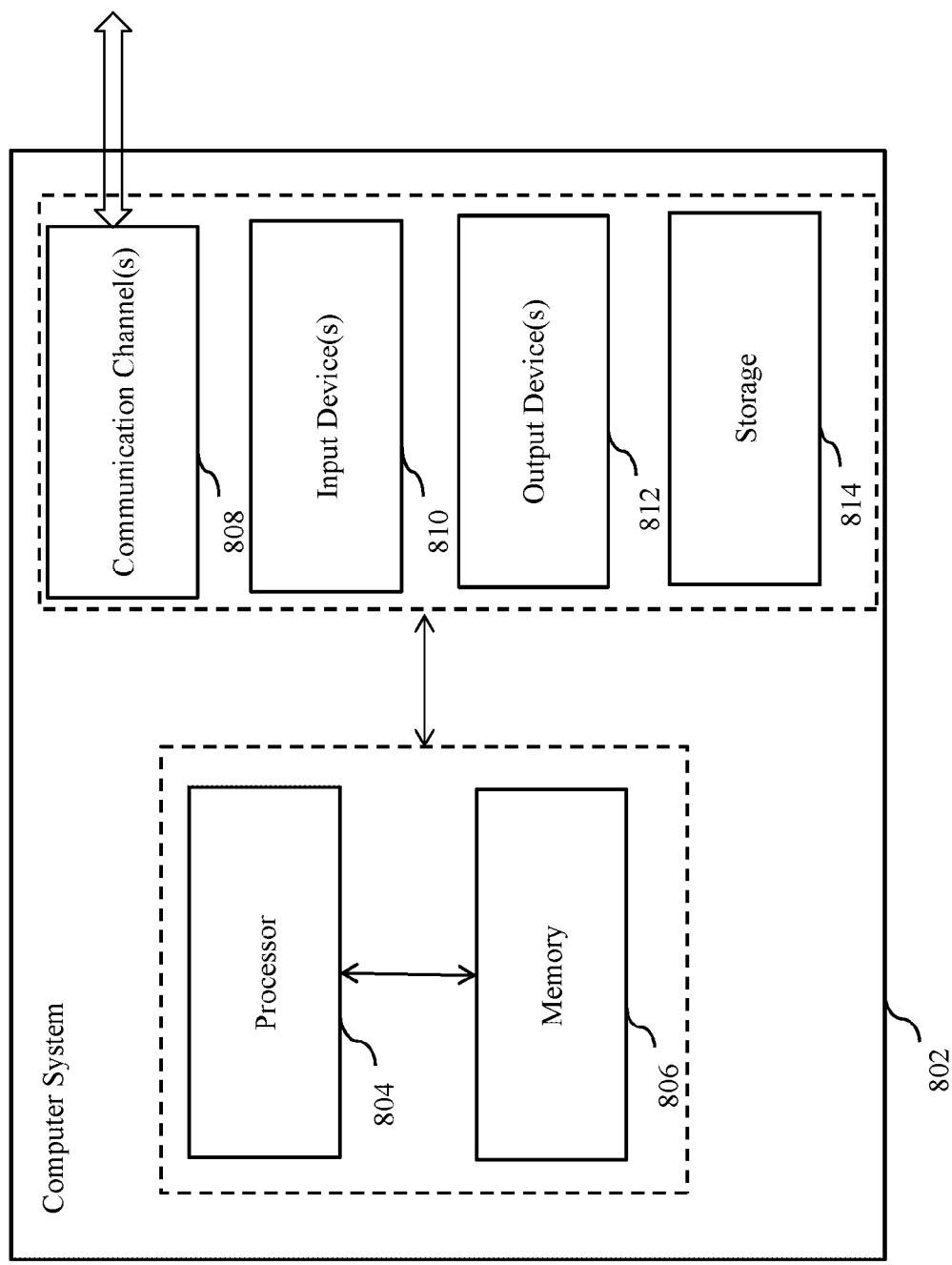
FIG. 8 illustrates an exemplary system in accordance with the present invention.

FIG. 8 illustrates an exemplary system in which various embodiments of the invention, including one or more proxy nodes within a proxy cluster, may be implemented.

The system 802 comprises at-least one processor 804 and at-least one memory 806. The processor 804 executes program instructions and may be a real processor. The processor 804 may also be a virtual processor. The computer system 802 is not intended to suggest any limitation as to scope of use or functionality of described embodiments. For example, the computer system 802 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 806 may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 810 may include, but not limited to, a touch screen, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 802. In various embodiments of the present invention, the storage 814 contains program instructions for implementing the described embodiments.

While not illustrated in FIG. 8, the system of FIG. 8 may further include some or all of the components of a proxy node of the type more fully described in connection with FIG. 4 herein above.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

Embodiments of the invention relate to the field of Layer 7 software networking using any protocol, including HTTP and WebSocket protocols, with and without encryption such as TLS/SSL, and relates to the field of APIS and other programmatic interfaces.

The current state of the art is a single HTTP protocol server level load balancing at Layer 7 with no Application or API focus/relationships.

The objective of embodiments of the present invention is to scale, track and secure all types of API's in the cloud datacenter using software defined networking with elasticity for mobile apps, HTML5, web apps, IoT devices, etc.

Embodiments of the present invention are directed at API load balancing with API connection/access tracking and firewall capabilities for services running in cloud datacenters.

Figure 9:
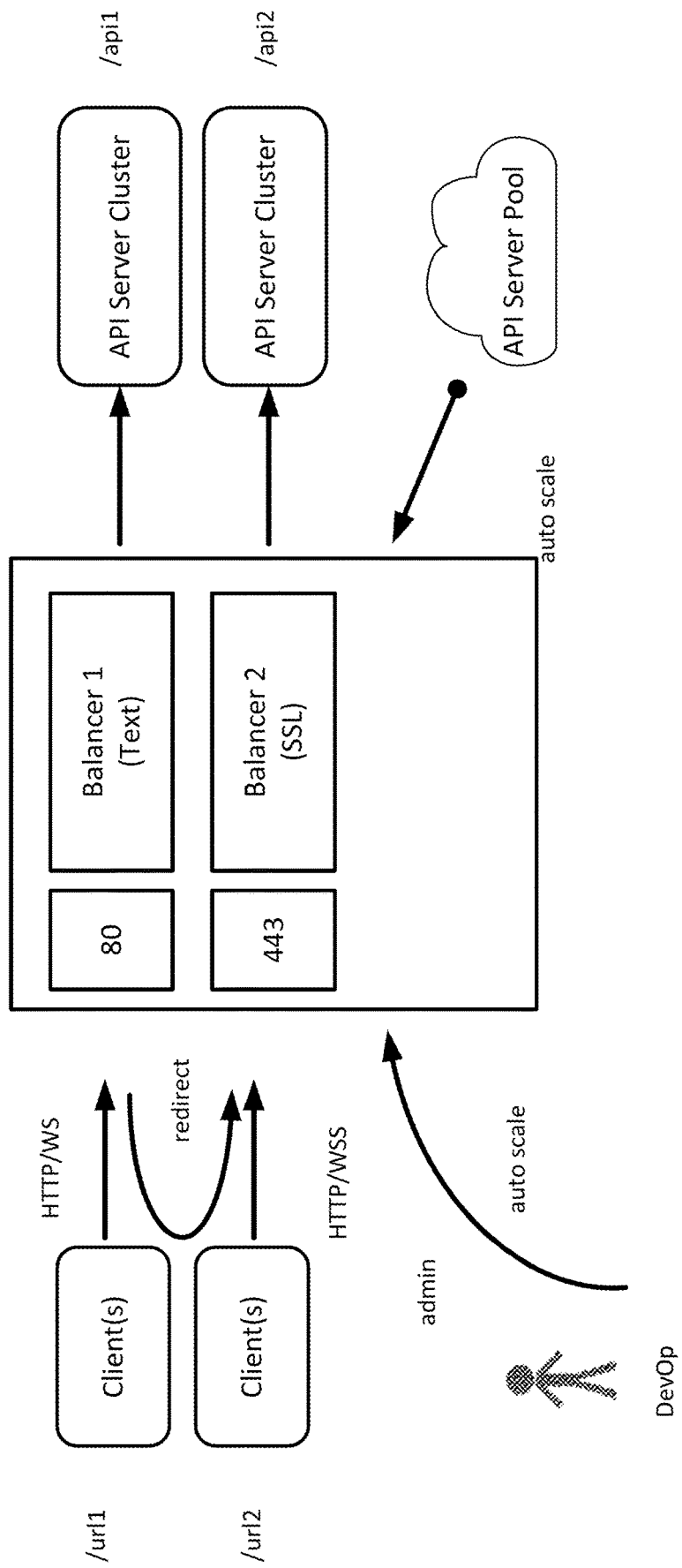
FIG. 9 illustrates an embodiment of a software architecture for an API Load Balancer, according to embodiments described herein.

FIG. 9 illustrates one embodiment of a software architecture for an API Load Balancer with API access tracking and Firewall capabilities. The unique architecture blends Layer 7 networking protocols with API capabilities and provides a single integrated solution for load balancing, tracking access, and securing APIs.

In one embodiment, API Load Balancer is an Event Driven Architecture with dual data plane for text and encrypted protocols with a shared single control plane. This architecture allows the handling of complex API requests from many different types of clients (HTML5, Mobile, IoT, etc.) and uses less computing and memory resources for scale and security functions—while delivering improved performance.

A dual data plane with multiple processes allows handling large number of TCP/SSL connections using both our event driven implementation and the availability of underlying file descriptors from the operating system. The separation of data planes for text and encrypted protocols allows setting different policies for security and increases the protection of backend APIs. The modular protocol engine inside the data plane (balancer) allows adding more (in addition to HTTP and WebSocket) Layer 7 protocols based on market needs—MQTT is one of them.

In one embodiment, the control plane is responsible for the entire life cycle of the API load balancer including launching balancer processes, clustering, configuring, auto-scaling, and exposing internal CLI/REST APIs for management. The controller is native to the multiple balancers functionality and uses IPC mechanisms (Unix Local Socket) for communication. This integrated model removes external single points of failure and allows implementers/DevOps to scale API load balancers easily as a single unit.

The API load balancer is native C++ code running in the Linux OS' user space. It also supports cookie persistence by means of a permanent storage device such as an SSD drive using a NoSQL database. The cluster supports mirroring of configurations and cookies across all instances of API Load balancers. An administrator/DevOps focused CLI is exposed for management. Internal REST APIs allows backend API servers to add, update, modify, and delete server pool in the configuration for auto scaling.

The application centric infrastructure inside datacenters is going through a major transition from static, hardware-driven to dynamic, software-driven infrastructures due to 1) the high growth of devices and apps getting deployed and connected to the internet and 2) the efficiency that the software-only model brings to IT organizations.

A second significant change is the exploding use of APIs as APIs allow data and compute services to be reused, shared, and monetized enabling organizations to innovate faster. Developers and DevOps rely more than ever on API's to speed up the delivery of new applications by using disparate pieces of existing application code as building blocks for their offering.

In this modern Cloud-first and API-first software-defined datacenter, there is a need for elastic software solutions to handle multiple Layer 7 protocols for load balancing, scaling, securing, firewalling, and tracking all APIs accessed.

The API Load Balancer, as illustrated in FIG. 9, may include any combination of the following embodiments in the software architecture. The following is the list and description of each of the embodiments:

1. Multi-Protocol Cookie-Based and Token-Based Stickiness for Both HTTP and Web Socket Protocols The "cookie" in web browsers and the "token" in mobile apps are primary identity technologies for connection authentication and authorization. Modern web services applications expose thousands of API's with multiple protocols for communicating with apps. One embodiment discussed herein dynamically learns the cookie or token from the API response and applies the same cookie or token when the client's request comes back in either the HTTP or WebSocket connection and then routes the request automatically and dynamically to the correct back-end API server. This embodiment uses a unique combination of HTTP header and underlying TCP connection keep-alive techniques for providing cookie-based stickiness for both HTTP and Web Socket. An engine of the present embodiment learns the set-cookie or token from the API response, remembers it as being part of the underlying TCP connection that is being kept alive by our engine, and if the client upgrades the connection to Web Socket, the engine uses the same TCP connection to connect back to the same API server which authenticated the initial request—creating cookie or token stickiness as a result for the end-to-end session.

2. Separation of Control and Data Planes—with Dual Data Planes

One embodiment discussed herein simplifies the management of multiple connection types and end points. The separation of concern enables the creation of a single layer 7 control functions to support multiple data planes, also called balancers The embodiment defines how a single controller creates 2 separate master processes—one for port 80 and one for port 443. Each master process creates its own set of child processes to handle all connections associated with its port. The controller identifies all port 443 connections automatically to initiate SSL certificate operations. This embodiment is achieved by using a modular configuration for each back-end API being connected to and using a bi-directional IPC mechanism to enable communications between controller and balancers.

3. Multiple Processes for a Single Port for Each Data Plane

One embodiment enables the support of a greater number of TCP/SSL connections than is possible today. Today a single process is attached to each TCP port in a Unix/Linux server. This embodiment enables the load balancer to attach multiple processes to a single TCP port on a Unix/Linux server in order to handle a large number of TCP/SSL connections. A master balancer process is created by the controller which also tells the master how many child processes can be created. An IPC mechanism and a shared memory between the master and the various child processes are used to share a number of parameters such as configurations information, cookies, tokens, routing logic etc. This allows multiple child processes to be connected to the same TCP port. This technique is dynamic and optimizes the underlying CPU, Memory, and IO available from the server. This technique can be referred to as vertical scaling in Layer 7 network routing.

4. API Level Load Balancing for REST and WebSocket API's

Existing server load balancers use 2 parameters (IP address and Port number) for load balancing all requests to back-end web and app servers. One embodiment uses 3 parameters (IP address, Port number and API name) for load balancing requests directly to the back-end APIs being used by the client application. This embodiment (which can be considered a 3 parameter method) allows accessing APIs directly as opposed to having the TCP connection made first with the server hosting the APIs and then relying on the server to create a path to the API as is the case with the 2 parameter load balancing method. The embodiment also allows separating different types of APIs, such as REST APIs and WebSocket APIs, and setting different policies for polling vs streaming of data. The client TCP connection is inspected at the URL level and the path name is decoded to understand the API name associated with the host name. The API information is then matched by our balancer using our own configuration mapping file to correctly identify the back-end API server. The server TCP connection is then established at the API level and packets are subsequently transferred directly to the API.

5. JSON-Based API Mapping and Configuration File

One embodiment, as discussed herein, is to simplify and automate the configuration for the balancer using JSON format with API details as oppose to server details, The following is the format of this embodiment:

```
{
    "api_metadata": {
        "protocol": "ws",
        "url": "/websocket_echo/*"
        "cookie": "JSESSIONID",
        "timeout": "20",
        "logout_api_enabled": "true",
        "health_check_interval": "60",
        "health_retry_count": "4",
        "health_request_path": "/websocket_echo/websocket/health",
        "health_retry": "true",
        "health_ping_string": "ping",
        "health_pong_string": "pong",
        "cookie_persistence_enabled": "true",
        "memory_size": "128MB",
        "servers": [
            {
                "ip": "127.0.0.1",
                "port": "8080"
            },
            {
                "ip": "127.0.0.1",
                "port": "8090"
            }
        ]
    }
}
```

6. Distributed Cluster Across Datacenters

One embodiment allows a client app to transparently connect to multiple servers, racks or datacenters regardless of physical location or Cloud type. This embodiment uses the Elected Coordinator and Node concepts combined with persistence to cluster multiple balancers and associate them to a single back-end API. A cluster of balancers can span multiple servers, racks or datacenters—including both private and public Clouds (also called hybrid environments) such as Amazon AWS or Microsoft Azure for example. By sharing our own API mapping and configuration files across all balancers inside a cluster, we allow a client connection to transparently move dynamically from one server to another—even if the other server is in a different Cloud or datacenter. With this embodiment the management of clusters is achieved by notifying the coordinator and having the coordinator update all nodes automatically—for any change. Each node maintains a separate list and is self-contained with all configuration information. This allows each node to serve client requests across servers, racks or datacenters. Each node can physically be deployed in any datacenter.

7. Live Updates of API Servers for Auto Scale

The business continuity of any web application is based on the ability to add, modify and delete back-end APIs without affecting the continuity of the service itself. With existing implementations, changes to back-end API servers force load balancers to be taken out of service so that they can be updated before being put back on line. One embodiment allows for the dynamic update of load balancers configurations without affecting the services supported by APIs and web applications. They are not taken out of service in order to capture the latest back-end service API changes. This embodiment has multiple processes for each port and maintains a shared map for API server pool configuration information. The live update of load balancer configuration information to reflect the changes made to an API server is achieved by dynamically updating the shared map and having each balancer process receive notification from the map update process.

8. Cookie and Token Persistence

Modern web applications use long-lived session persistence including no expiration of cookies or tokens in order to maintain a simpler user experience, including simpler or no login, etc. One embodiment is about sharing cookies and tokens across multiple balancer processes in a single server by using a shared light weight NoSQL database and periodically saving them to an available permanent storage such as an SSD using a background thread without disrupting the client request. Each balancer has the ability to dynamically read back cookies and tokens to memory when needed to serve client requests.

9. Session Mirroring and Correlation

Embodiments of this technique can be referred to as session monitoring across servers, racks or datacenters.

Session mirroring enables end users to access a backend application or service and maintain the same session when switching client platforms—from a mobile phone to a PC for example—or/and switching location, for seamless session continuity. As an example a user on a mobile phone accessing a service in San Francisco, connected to the local datacenter, will maintain his session when switching to a PC after arriving in Los Angeles and now being connected to that local datacenter.

This embodiment uses embodiment #6 (Distributed Clusters across Datacenters) together with embodiment #8 (Cookie and Token Persistence) and the following additional technique. The technique involves maintaining synchronization across all the NoSQL databases used by the balancers to maintain session information, cookies, and tokens. Synchronization is achieved by using a process to monitor each shared NoSQL database for changes and then broadcasting using a real-time broadcasting algorithm these updates to all other NoSQL databases so that the updates will be captured and saved by each one of them. This results in all NoSQL database containing the same information.

This embodiment also exposes an internal API to be used by backend API servers or application servers to access the NoSQL database in order to retrieve the multiple cookies/tokens created for the same user when using different devices (mobile, desktop) to dynamically synchronize sessions. This technique can be referred to as session correlation.

Another embodiment can include the ability to check the expiration of cookies and tokens based on both the timestamp and the API logout information in order to remove them from the database. This embodiment blocks expired connections from possibly going to backend APIs again in order to improve performance and security.

10. API Firewall

API security is critical for data protection. Today there are major attacks taking place around the world to access government or business data and applications. Given that APIs are the interface to access these data and applications, proper defenses are critical.

1) External Name/ID Mapping. One embodiment protects APIs, and any programmatic interface, by mapping a different name, or ID, externally than the one used for the API or the programmatic interface itself. That "external facing" name or ID is the one used with the outside world instead of its given internal name or ID. The client TCP connection uses that external name/ID to access the API or programmatic interface. That connection is terminated by our balancer which then uses our internally configured policy map to identify the right internal API or programmatic interface name to use in order to establish server TCP connections for packet transfer.

The mapping is created using policy based configurations that uniquely map each API name to an external facing newly created name or ID. Management interface enable administrators to modify names and naming methods.

With this embodiment all other API names configured in an API server are now invisible to the client connection since they are not available to the request, unlike existing implementations that make all API names visible to the connections therefore making them prone to attacks.

2) Method Calls Enforcement. Another embodiment is the enforcement of API consumption policies to guarantee that the utilization of an API is in line with its intended usage. This is to prevent hackers from using certain APIs to illegally access data and applications. Our consumption policy enforcement invention checks all incoming API requests at the fine-grained HTTP method levels: GET, POST, DELETE, etc. and validates that the method used corresponds to the type of calls allowed by the API. It will automatically log and can terminate the connections if it's not an allowed method call for the backend API servers. For each API, a specific set of methods is specified in a configuration file when the API is created. When a client request reaches the balancer, the method call being used by the client will be compared against the allowed methods specified in the configuration file to determine whether the request is valid. A variety of actions can then be taken automatically to for example, but not restricted to, terminate, log, and audit trail the connection.

The embodiments covering the enforcement of allowed API method call is equally extended to all APIs and application interfaces used in layer 7 protocols such as for example, but not restricted to SOAP, SIP, HTTP/2, WebSocket/2. This allows our engine to guarantee that a call placed to access data or an application is in line with the intended use of that programmatic interface regardless of the interface calls used.

This embodiment also covers the enforcement of the API used at the layer 7 protocol level for example the specific use of a REST API versus a Web Socket API or other call.

3) Content Type Inspection and Enforcement. This embodiment is about enforcing policies established regarding the use of content type associated with a specific API call. For each API, a specific content type—for either text or binary content—is specified in a configuration file when the API is created. When a client request reaches the balancer, the content type being used by the client will be compared against the allowed content type specified in the configuration file to determine whether the request is valid. A variety of actions can then be taken automatically to for example, but not restricted to, terminate, log, and audit trail the connection.

The content type inspection covers both text and binary content types.

The embodiment covering the enforcement of allowed content type is equally extended to all programmatic and application interfaces used in layer 7 protocols such as for example, but not restricted to, SOAP, SIP, HTTP/2, WebSocket/2. This allows our engine to guarantee that a call placed to access data or an application is in line with the intended use of that programmatic interface regardless of the interface calls used.

11. API Connection Tracking

One embodiment tracks connections end-to-end, capturing the information from both ends of the connection: a) the client app connection information on one end and b) the information about the API and backend application and data accessed on the other end. Information captured includes for example User agent info, device/OS, app, IP address, API name . . . .

This embodiment is able to not only log all "end-to-end" connection information for display, reporting, analysis, but also to feed it through a set of machine learning algorithms to establish baselines in order to detect abnormal situations coming from hacking attempts.

Any combination of the above described embodiments can be used for API load balancing with API connection/access tracking and firewall capabilities for services running in cloud datacenters.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "learning", "defining", "accessing", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes presented herein are not inherently related to any particular computer or other apparatus. Various general purpose systems may be used with programs in accordance with the teachings herein, or it may prove convenient to construct a more specialized apparatus to perform the required method steps.

It is to be understood that the above description is intended to be illustrative, and not restrictive. Many other embodiments will be apparent to those of skill in the art upon reading and understanding the above description.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A method, comprising:
receiving, at a first networking device to be included in a plurality of networking devices, address information of a second networking device from the plurality of networking devices;
establishing, at the first networking device and based on the address information of the second networking device, a read-write connection with the second networking device;
acquiring, at the first networking device and via the read-write connection with the second networking device, data states of the second networking device, the data states of the second networking device including address information of remaining networking devices from the plurality of networking devices, the remaining networking devices including each networking device from the plurality of networking devices other than the first networking device and the second networking device;
establishing, at the first networking device and based on the address information of the remaining networking devices, read-write connections with remaining networking devices from the plurality of networking devices;
acquiring, at the first networking device and via the read-write connections with the remaining networking devices, data states of the remaining networking devices; and
synchronizing data states of the first networking device with the data states of the second networking device and the data states of the remaining networking devices.

2. The method of claim 1, further comprising:
receiving, at the first networking device, an Application Programming Interface (API) request from a client device; and
routing the API request to a server from a plurality of servers based on information included in the API request and the data states of the first networking device,
the data states of the first networking device including information descriptive of a plurality of APIs implemented on the plurality of servers.

3. The method of claim 1, wherein the data states of the first networking device include:
server characteristic data including information descriptive of one or more characteristics of one or more servers;
session data including information descriptive of one or more client devices communicating with the one or more servers via at least one networking device from the plurality of networking devices;
security data associated with one or more sessions between the one or more client devices and the one or more servers;
configuration data associated with routing API requests from the one or more client devices to the one or more servers; and
networking device data including information descriptive of the plurality of networking devices.

4. The method of claim 1, further comprising:
modifying one or more entries of a Domain Name System (DNS) server to include address information of the first networking device such that the DNS server facilitates routing of API requests of one or more client devices to the first networking device, the DNS server operatively coupled to the one or more client devices.

5. The method of claim 1, further comprising:
sending, from the first networking device, messages at periodic intervals to a third networking device from the plurality of networking devices; and
in response to not receiving a response from the third networking device after sending a predefined number of the messages, modifying networking device data included in the data states of the first networking device to: indicate that the third networking device is inactive, or remove an identifier of the third networking device from the networking device data.

6. The method of claim 1, wherein the synchronizing the data states of the first networking device with the data states of the second networking device and the data states of the remaining networking devices includes synchronizing the data states of the first networking device with the data states of the second networking device and the data states of the remaining networking devices at periodic intervals.

7. The method of claim 1, further comprising:
receiving, via a command-line interpreter (CLI) or a RESTful API (REST API), an input to modify information included in the data states of the first networking device;
modifying the data states of the first networking device based on the input; and
sending, after the modifying the data states, the data states of the first networking device to the second networking device and the remaining networking devices such that the data states of the second networking device and the data states of the remaining networking devices are synchronized with the data states of the first networking device.

8. The method of claim 1, further comprising:
detecting, at the first networking device, a synchronization event including at least one of:
a networking device being added to the plurality of networking devices;
a networking device from the plurality of networking devices becoming active after a period of inactivity; or
an expiration of a predefined period of time,
synchronizing the data states of the first networking device with the second networking device and the remaining networking devices in response to detecting the synchronization event.

9. An apparatus, comprising:
a memory; and
a processor associated with a first networking device to be included in a plurality of networking devices, the processor operatively coupled to the memory and configured to:
receive address information of a second networking device from the plurality of networking devices;
establish, based on the address information of the second networking device, a read-write connection with the second networking device;
acquire, via the read-write connection with the second networking device, data states of the second networking device, the data states of the second networking device including address information of remaining networking devices from the plurality of networking devices, the remaining networking devices including each networking device from the plurality of networking devices other than the first networking device and the second networking device;
establish, based on the address information of the remaining networking devices, read-write connections with remaining networking devices from the plurality of networking devices;
acquire, via the read-write connections with the remaining networking devices, data states of the remaining networking devices; and
synchronize data states of the first networking device with the data states of the second networking device and the data states of the remaining networking devices.

10. The apparatus of claim 9, wherein the processor is further configured to:
receive an Application Programming Interface (API) request from a client device; and
route the API request to a server from a plurality of servers based on information included in the API request and the data states of the first networking device,
the data states of the first networking device including information descriptive of a plurality of APIs implemented on the plurality of servers.

11. The apparatus of claim 9, wherein the data states of the first networking device include:
server characteristic data including information descriptive of one or more characteristics of one or more servers;
session data including information descriptive of one or more client devices communicating with the one or more servers via at least one networking device from the plurality of networking devices;
security data associated with one or more sessions between the one or more client devices and the one or more servers;
configuration data associated with routing API requests from the one or more client devices to the one or more servers; and
networking device data including information descriptive of the plurality of networking devices.

12. The apparatus of claim 9, wherein the processor is further configured to:
modify one or more entries of a Domain Name System (DNS) server to include address information of the first networking device such that the DNS server facilitates routing of API requests of one or more client devices to the first networking device, the DNS server operatively coupled to the one or more client devices.

13. The apparatus of claim 9, wherein the processor is further configured to:
send messages at periodic intervals to a third networking device from the plurality of networking devices; and
in response to not receiving a response from the third networking device after sending a predefined number of the messages, modifying networking device data included in the data states of the first networking device to: indicate that the third networking device is inactive, or remove an identifier of the third networking device from the networking device data.

14. The apparatus of claim 9, wherein the processor is configured to synchronize the data states of the first networking device with the data states of the second networking device and the data states of the remaining networking devices by synchronizing the data states of the first networking device with the data states of the second networking device and the data states of the remaining networking devices at periodic intervals.

15. The apparatus of claim 9, wherein the processor is further configured to:
receive, via a command-line interpreter (CLI) or a RESTful API (REST API), an input to modify information included in the data states of the first networking device;
modify the data states of the first networking device based on the input; and
send, after the modifying the data states, the data states of the first networking device to the second networking device and the remaining networking devices such that the data states of the second networking device and the data states of the remaining networking devices are synchronized with the data states of the first networking device.

16. A non-transitory processor-readable medium storing code representing instructions to be executed by a processor associated with a first networking device to be included in a plurality of networking devices, the code comprising code to cause the processor to:
receive address information of a second networking device from the plurality of networking devices;
establish, based on the address information of the second networking device, a read-write connection with the second networking device;
acquire, via the read-write connection with the second networking device, data states of the second networking device, the data states of the second networking device including address information of remaining networking devices from the plurality of networking devices, the remaining networking devices including each networking device from the plurality of networking devices other than the first networking device and the second networking device;
establish, based on the address information of the remaining networking devices, read-write connections with remaining networking devices from the plurality of networking devices;
acquire, via the read-write connections with the remaining networking devices, data states of the remaining networking devices; and
synchronize data states of the first networking device with the data states of the second networking device and the data states of the remaining networking devices.

17. The non-transitory processor-readable medium of claim 16, wherein the code further comprises code to cause the processor to:
receive an Application Programming Interface (API) request from a client device; and
route the API request to a server from a plurality of servers based on information included in the API request and the data states of the first networking device,
the data states of the first networking device including information descriptive of a plurality of APIs implemented on the plurality of servers.

18. The non-transitory processor-readable medium of claim 16, wherein the code further comprises code to cause the processor to:
modify one or more entries of a Domain Name System (DNS) server to include address information of the first networking device such that the DNS server facilitates routing of API requests of one or more client devices to the first networking device, the DNS server operatively coupled to the one or more client devices.

19. The non-transitory processor-readable medium of claim 16, wherein the code further comprises code to cause the processor to:
send messages at periodic intervals to a third networking device from the plurality of networking devices; and
in response to not receiving a response from the third networking device after sending a predefined number of the messages, modifying networking device data included in the data states of the first networking device to: indicate that the third networking device is inactive, or remove an identifier of the third networking device from the networking device data.

20. The non-transitory processor-readable medium of claim 16, wherein the code further comprises code to cause the processor to:
receive, via a command-line interpreter (CLI) or a RESTful API (REST API), an input to modify information included in the data states of the first networking device;
modify the data states of the first networking device based on the input; and
send, after the modifying the data states, the data states of the first networking device to the second networking device and the remaining networking devices such that the data states of the second networking device and the data states of the remaining networking devices are synchronized with the data states of the first networking device.

* * * * *